United States Patent
Barrera et al.

(10) Patent No.: US 8,541,322 B2
(45) Date of Patent: Sep. 24, 2013

(54) SIDEWALL FUNCTIONALIZATION OF CARBON NANOTUBES WITH ORGANOSILANES FOR POLYMER COMPOSITES

(75) Inventors: Enrique V. Barrera, Houston, TX (US); Jiang Zhu, Houston, TX (US); Lei Zhang, Houston, TX (US); Valery N. Khabashesku, Houston, TX (US); John L. Margrave, Bellaire, TX (US); Mary Lou Margrave, legal representative, Bellaire, TX (US); Jong Dae Kim, Seoul (KR)

(73) Assignee: William Marsh Rice University, Houston, TX (US)

( * ) Notice: Subject to any disclaimer, the term of this patent is extended or adjusted under 35 U.S.C. 154(b) by 441 days.

(21) Appl. No.: 10/576,134

(22) PCT Filed: Jul. 28, 2004

(86) PCT No.: PCT/US2004/024338
§ 371 (c)(1),
(2), (4) Date: Jul. 13, 2007

(87) PCT Pub. No.: WO2005/012171
PCT Pub. Date: Feb. 10, 2005

(65) Prior Publication Data
US 2007/0298669 A1 Dec. 27, 2007

Related U.S. Application Data

(60) Provisional application No. 60/490,664, filed on Jul. 28, 2003.

(51) Int. Cl.
*B32B 17/02* (2006.01)

(52) U.S. Cl.
USPC ............ 442/180; 442/172; 442/175; 442/198

(58) Field of Classification Search
USPC .................................. 442/198, 172, 175, 180
See application file for complete search history.

(56) References Cited

U.S. PATENT DOCUMENTS

| | | | | |
|---|---|---|---|---|
| 3,312,569 | A * | 4/1967 | Philipps et al. | 428/378 |
| 5,374,415 | A | 12/1994 | Alig et al. | |
| 6,270,897 | B1 * | 8/2001 | Flautt et al. | 428/391 |
| 6,645,455 | B2 | 11/2003 | Margrave et al. | |
| 2004/0211942 | A1 * | 10/2004 | Clark et al. | 252/500 |
| 2005/0191490 | A1 * | 9/2005 | Ton-That et al. | 428/407 |

FOREIGN PATENT DOCUMENTS

| | | |
|---|---|---|
| WO | WO 2005/028740 | 3/2005 |
| WO | WO 2005/030858 | 4/2005 |

OTHER PUBLICATIONS

Ajayan, Pulickel M. et al, "Single-Walled Carbon Nanotube-Polymer Composites-Strength and Weakness," 2000, Advanced Materials, vol. 12 No. 10, pp. 750-753.*
Iijima, "Helical microtubules of graphitic carbon," Nature (1991) 354, pp. 56-58.

(Continued)

*Primary Examiner* — Peter Y Choi
(74) *Attorney, Agent, or Firm* — Winstead PC

(57) ABSTRACT

The present invention is directed to methods of functionalizing carbon nanotubes (CNTs), particularly single-wall carbon nanotubes (SWNTs), with organosilane species, wherein such functionalization enables fabrication of advanced polymer composites. The present invention is also directed toward the functionalized CNTs, advanced CNT-polymer composites made with such functionalized CNTs, and methods of making such advanced CNT-polymer composites.

14 Claims, 25 Drawing Sheets

(56) References Cited

OTHER PUBLICATIONS

Iijima et al, "Single-shell carbon nanotubes of 1-nm diameter," Nature (1993) 363, pp. 603-605.
Bethune et al, "Cobalt-catalysed growth of carbon nanotubes with single-atomic-layer walls," Nature (1993) 363, pp. 605-607.
Calvert, "A recipe for Strength," Nature (1999) 399, pp. 210-211.
Thostenson, "Advances in the science and technology of carbon nanotubes and their composites: a review," Composite Science and Technology (2001) 61, pp. 1899-1912.
Schadler et al, "Load transfer in carbon nanotube epoxy composites," Appl. Phys. Lett. (1998) 73, pp. 3842-3844.
Ajayan et al, "Single-Walled Carbon Nanotube-Polymer Composites: Strength and Weakness," Adv. Mater.(2000) 12, pp. 750-753.
Khabashesku et al, "Chemistry of Carbon Nanotubes," Encyclopedia of Nanoscience and Nanotechnology (2004) 1, pp. 1-47.
Khabashesku et al, "Fluorination of Single-Wall Carbon Nanotubes and Subsequent Derivatization Reactions," Acc. Chem. Res. (2002) 35, pp. 1087-1095.
Bahr et al, "Covalent chemistry of single-wall carbon nanotubes," J. Mater. Chem. (2002) 12, pp. 1952-1958.
Hafner et al, "Catalytic growth of single-wall carbon nanotubes from metal particles," Chem. Phys. Lett. (1998) 296, pp. 195-202.
Cheng et al, "Bulk morphology and diameter distribution of single-walled carbon nanotubes . . . ," Chem. Phys. Lett. (1998) 289, pp. 602-610.
Nikolaev et al, "Gas-phase catalytic growth of single-walled carbon nanotubes from carbon monoxide," Chem. Phys. Lett. (1999) 313, pp. 91-97.
O'Connell et al, "Band Gap Fluorescence from Individual Single-Walled Carbon Nanotubes," Science, (2002) 297, pp. 593-596.
Bachilo et al, "Structure-Assigned Optical Spectra of Single-Walled Carbon Nanotubes," Science (2002) 298, pp. 2361-2366.
Strano et al, "Electronic Structure Control of Single-Walled Carbon Nanotube Functionalization," Science (2003) 301, pp. 1519-1522.
Chiang et al., "Purification and Characterization of Single-Wall Carbon Nanotubes," J. Phys. Chem. B (2001) 105, pp. 1157-1161.
Chiang et al., "Purification and Characterization of Single-Wall Carbon Nanotubes (SWNTs) Obtained from the Gas-Phase . . . ," J. Phys. Chem. B (2001) 105, pp. 8297-8301.
Liu et al., "Fullerene Pipes," Science (1998) 280, pp. 1253-1256.
Gu et al, "Cutting Single-Wall Carbon Nanotubes through Fluorination," Nano Lett. (2002) 2, pp. 1009-1013.
Georgakilas et al, "Organic Functionalization of Carbon Nanotubes," J. Am. Chem. Soc., (2002) 124, pp. 760-761.
Barrera, "Key Methods for Developing Single-Wall Nanotube Composites," JOM (2000) 52, pp. 38-42.
Zhu et al, "Improving the Dispersion and Integration of Single-Walled Carbon Nanotubes in Epoxy . . . ," Nano Lett., (2003) 3, pp. 1107-1113.
Zhu et al, "Reinforcing Epoxy Polymer Composites Through Covalent Integration . . . ," Adv. Funct. Mater. (2004) 14, pp. 643-648.
Pantarotto et al, "Synthesis Structural Characterization, and Immunological Properties of Carbon Nanotubes . . . ," J.Am. Chem. Soc. (2003) 125, pp. 6160-6164.
Zhang et al, "Sidewall Functionalization of Single-Walled Carbon Nanotubes with Hydroxl . . . ," Chem. Mater., (2004) 16, pp. 2055-2061.
Ebbesen, "Carbon Nanotubes," Annu. Rev. Mater. Sci. (1994) 24, pp. 235-264.
Thess et al., "Crystalline Ropes of Metallic Carbon Nanotubes," Science (1996) 273, pp. 483-487.
Vander Wal et al., "Flame Synthesis of Fe Catalyzed Single-Walled Carbon Nanotubes and Ni Catalyzed Nanofibers . . . ," Chem. Phys. Lett. (2001) 349, pp. 178-184.
Anderson et al., "Analysis of Silicones," A.L. Smith, editor, Wiley-Interscience, New York (1974) Chapter 10.
Mickelson et al, "Fluorination of Single-Wall Carbon Nanotubes," Chem. Phys. Lett. (1998) 296, pp. 188-194.
Lau, "Effectiveness of using carbon nanotubes as nano-reinforcements for advanced composite structures," Carbon (2002) 40, pp. 1605-1606.
Velasco-Santos et al., "Chemical Functionalization of Carbon Nanotubes Through an Organosilane," Nanotechnology (2002) 13, pp. 495-498.
Chiang, I. W. Ph.D. Thesis, Rice University, Houston, TX (2001) pp. 1-171.

\* cited by examiner

(A)

--PRIOR ART--

HO(CH$_2$)$_n$CH(R)OH 2 a R = H, n = 1
  b R = H, n = 2
  c R = H, n = 3
  d R = CH$_3$, n = 1
  e R = CH$_2$CH$_3$, n = 1

MOH

[F]$_x$ + MO(CH$_2$)$_n$CH(R)OH $\xrightarrow[\text{- MF}]{\text{30 min sonication}}$ [O(CH$_2$)$_n$CH(R)OH]$_y$ M = Li, Na, K

1

3 a R = H, n = 1
  b R = H, n = 2
  c R = H, n = 3
  d R = CH$_3$, n = 1
  e R = CH$_2$CH$_3$, n = 1

(B)

HOCH$_2$CH(OH)CH$_2$OH

2f

MOH

[F]$_x$ + MOCH$_2$CH(OH)CH$_2$OH $\xrightarrow[\text{- MF}]{\text{30 min sonication}}$ [OCH$_2$CH(OH)CH$_2$OH]$_y$ M = Li, Na, K

1

3f

--PRIOR ART--

SIDEWALL FUNCTIONALIZATION OF CARBON NANOTUBES WITH ORGANOSILANES FOR POLYMER COMPOSITES

CROSS REFERENCE TO RELATED APPLICATIONS

This Application claims priority to U.S. Provisional Patent Application Ser. No. 60/490,664, filed Jul. 28, 2003.

This invention was made with government support under Office of Naval Research Grant No. N00014-03-1-0296, awarded by the U.S. Department of Defense; and Grant No. NCC-1-02038, awarded by the National Aeronautics and Space Administration. The government has certain rights in the invention.

FIELD OF THE INVENTION

The present invention relates generally to carbon nanotubes, and specifically to methods of functionalizing carbon nanotubes with organosilanes and methods of making polymer composites comprising such functionalized nanotubes.

BACKGROUND OF THE INVENTION

Carbon nanotubes (CNTs), comprising multiple concentric shells and termed multi-wall carbon nanotubes (MWNTs), were discovered by Iijima in 1991 [Iijima, S. *Nature* 1991, 354, 56]. Subsequent to this discovery, single-wall carbon nanotubes (SWNTs), comprising a single graphene rolled up on itself, were synthesized in an arcdischarge process using carbon electrodes doped with transition metals [Iijima, S.; Ichihashi, T. *Nature* 1993, 363, 603; and Bethune, D. S.; Kiang, C. H.; de Vries, M. S.; Gorman, G.; Savoy, R.; Vasquez, J; Beyers, R. *Nature* 1993, 363, 605]. These carbon nanotubes (especially SWNTs) posses unique mechanical, electrical, and thermal properties, and such properties make them attractive for a wide variety of applications.

With extremely high modulus, strength, flexibility and lightweight, carbon nanotubes are seen as excellent reinforcement candidates for developing next generation advanced composites materials [Calvert, P. *Nature*, 1999, 399, 210; Thostenson, *Composite Science and Technology*. 2001, 61, 1899-1912; Maruyama, B., Alam, K. *SAMPE Journal*, "Carbon Nanotubes and Nanofibers in Composites Materials," 2002, 38 (3), 59-70]. Expected property enhancements for composites include: enhanced strength and stiffness, improved toughness and shear strength, other Z-axis properties, and improved electrical and thermal conductivity. Significant efforts are being made to advance polymer nanocomposites by the addition of carbon nanotubes. However, it has been realized that, in order to take advantage of the extraordinary properties of nanotubes, an effective load transfer from the matrix to nanotubes must exist [L. S. Schadler, S. C Giannaris, P. M. Ajayan, "Load Transfer in Carbon Nanotube Epoxy Composites," *Appl. Phys. Lett.*, 1998, 73 (26), 3842-3844; P. M. Ajayan and L. S. Schadler, "Single-walled carbon nanotube type-Polymer Composite: Strength & Weakness," *Adv. Mater.*, 2000, 12 (10), 750-753; Lau, K. T., "Effectiveness of using carbon nanotubes as nano-reinforcements for advanced composite structures," *Carbon*, 2002, 40, 1605-6]. So far, due to weak interaction between nanotubes and the polymer, the reinforcing role of nanotubes in composites is still very limited. Homogenous dispersion of nanotubes is also a necessary condition for producing an optimal reinforcing effect. Nanotubes tend to exist as bundles and are entangled as agglomerates, resulting in a poor dispersion within the polymer matrix. Although van der Waals forces might provide some physical interaction, optimal load transfer should be obtained from the matrix to the smaller bundles and, ideally, to the individual nanotubes. Therefore, unroping (debundling) the nanotubes for homogeneous dispersion remains a challenge for composites applications.

Chemical manipulation of single-wall carbon nanotubes (SWNT), especially sidewall functionalization, has recently become an area of escalated fundamental and technological interest—particularly for effecting the debundling of such SWNTs. Both covalent and noncovalent sidewall chemistry of SWNTs have been reported, including direct fluorination and subsequent derivatization, addition of radicals, carbenes and nitrenes as well as the 1,3-dipolar and electrophilic additions, and modification through van der Waals interactions with aromatic molecules or polymers. See Khabashesku, V. N.; Margrave, J. L. "Chemistry of Carbon Nanotubes" in *Encyclopedia of Nanoscience and Nanotechnology*, Ed. S. Nalwa, American Scientific Publishers, 2004, Vol. 1, pp. 849-861, and references therein; Khabashesku, V. N.; Billups, W. E.; Margrave, J. L. *Acc. Chem. Res.*, 2002, 35, 1087; Bahr, J. L.; Tour, J. M. *J. Mater. Chem.* 2002, 12, 1952; Georgakilas, V. et al., "Organic Functionalization of Carbon Nanotubes," *J. Am. Chem. Soc.*, 2002, 124 (5), 760-761. The applications of functionalized SWNTs as reinforcers for fabrication of covalently integrated polymer composites [Barrera, E. V. *JOM*, 2000, 52, 38; Zhu, J.; Kim, J.; Peng, H.; Margrave, J. L.; Khabashesku, V. N.; Barrera, E. V. *Nano Lett.* 2003, 3, 1107; Zhu, J.; Peng, H.; Rodriguez-Macias, F.; Margrave, J. L.; Khabashesku, V. N.; Imam, M. A.; Lozano, K.; Barrera, E. V. *Adv. Funct. Mater*, 2004, 14(7), 643-648] and as vehicles for targeted drug delivery have recently been demonstrated. See Pantarotto, D.; Partidos, C. D.; Graff, R.; Hoebeke, J.; Briand, J.-P.; Prato, M.; Bianco, A. *J. Am. Chem. Soc.* 2003, 125, 6160. Indeed, these studies have confirmed the need for derivatization of the SWNTs with the organic functional groups which can provide a high binding affinity and selectivity through covalent or hydrogen bond formation. They also suggest that for processability improvement, particularly in biomedical applications, covalent sidewall functionalization with moieties terminated with hydrophilic substituents, such as hydroxyl groups, should be of primary importance.

Recent experimental studies [Khabashesku, V. N.; Billups, W. E.; Margrave, J. L. *Acc. Chem. Res.*, 2002, 35, 1087] have shown that fluoronanotubes prepared by direct fluorination of SWNTs can be used as a versatile precursors for preparation of sidewall functionalized nanotube derivatives through a nucleophilic substitution of fluorine. A simple method for introducing hydroxyl functionalities to CNTs, and especially SWNTs, utilizing fluorinated carbon nanotubes as intermediates has also been demonstrated, permitting the dispersal of carbon nanotubes in polar solvents [L. Zhang et al., Chem. Mater. 2004, 16, 2055-2061]. Such functionalized CNTs are termed "hydroxyl-functionalized CNTs" or "hydroxyl-functionalized nanotubes" herein.

Recent research has shown a great deal of potential for the use of functionalized nanotubes as reinforcement in composites, wherein such reinforcement is derived primarily from the improved load transfer stemming from improved interaction and interfacial bonding [J. Zhu, H. Peng, F. Rodriguez-Macias, J. L. Margrave, V. N. Khabashesku, A. M. Imam, K. Lozano, E. V. Barrera, *Adv. Fun. Mater.*, 2004, 14(7), 643-648] Specifically, if such hydroxl-functionalized CNTs could be used for subsequent reactions to introduce specific polymerizable or crosslinkable moieties covalently onto the CNTs, such functionalized CNTs could be used to form high-performance composites with a wide variety of polymer systems.

BRIEF DESCRIPTION OF THE INVENTION

The present invention is directed to methods of functionalizing carbon nanotubes (CNTs), particularly single-wall carbon nanotubes (SWNTs), with organosilane species, wherein such functionalization enables fabrication of advanced polymer composites. The present invention is also directed toward the functionalized CNTs, advanced CNT-polymer composites made with such functionalized CNTs, and methods of making such advanced CNT-polymer composites.

Generally, functionalization, as described herein, occurs on the sidewalls of the CNTs, but can also or alternatively occur an the nanotube ends. In general, methods for functionalizing CNTs with organosilane species comprise the steps of: 1) providing fluorinated CNTs; 2) reacting the fluorinated CNTs with one or more species to yield CNTs functionalized with moieties comprising terminal hydroxyl groups (hydroxyl-functionalized CNTs); and 3) reacting the hydroxyl-functionalized CNTs with organofunctionalized silanols (hydrolyzed organoalkoxysilanes) bearing "polymer-interacting" functional moieties to yield organosilane-functionalized polymer-interacting CNTs, wherein such organosilane-functionalized polymer-interacting CNTs are capable of chemical interaction with a polymer host material.

By functionalizing CNTs in the above-described manner, two benefits are obtained: First, functionalized nanotubes can provide strong attachment to both fiber (other CNTs) and matrix (polymer) via chemical bonding. With polymer compatible organofunctional silane, direct inclusion of functionalized nanotube into polymeric matrices can be achieved. Second, a high level of nanotube unroping and the formation of relatively soluble materials in common organic solvents can be obtained and, therefore, offer opportunity for homogeneous dispersion in polymer matrices.

In some embodiments, the organosilane-functionalized polymer-interacting CNTs are mixed with polymeric precursor material (monomers) to form a polymerizable mixture. Subsequent polymerization yields an advanced CNT-polymer composite material.

In some embodiments, the organosilane-functionalized polymer-interacting CNTs are blended into thermoplastic polymer material. Appropriate functionalization affords improved blendability and possible covalent or other interaction with the polymer host.

In some embodiments, the CNTs are unroped or present as small ropes comprising just a few CNTs.

In some embodiments, one or more processing techniques of the present invention serves to eliminate fluorine from the composite polymer system.

In some embodiments, the organosilane-functionalized polymer-interacting CNTs undergo a characterization by one or more of the following techniques: Fourier transform infrared (FTIR) spectroscopy, Raman spectroscopy, scanning electron microscopy (SEM), and transmission electron microscopy (TEM).

CNT-polymer composites made by methods of the present invention are shown by DMA analysis to possess mechanical property enhancement.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
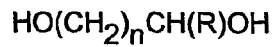
FIG. 1 depicts some exemplary chemical routes by which fluoronanotubes can be reacted with dialcohols to yield hydroxyl-functionalized CNTs.
Figure 1:
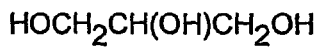

The present invention is directed to methods of functionalizing carbon nanotubes (CNTs) using organosilane species to attach functional moieties to carbon nanotubes, and to the products which are capable of covalent or other interaction with polymer matrices. The present invention is also directed to carbon nanotube-polymer composite materials comprising such organosilane-functionalized polymer-interacting CNTs, and to methods of making such CNT-polymer composites.

Generally, functionalization, as described herein, occurs on the sidewalls of the CNTs, but can also or alternatively occur an the nanotube ends. In general, methods for functionalizing CNTs with organosilane species comprise the steps of: 1) providing fluorinated CNTs; 2) reacting the fluorinated CNTs with one or more species to yield CNTs functionalized with moieties comprising terminal hydroxyl groups (hydroxyl-functionalized CNTs); and 3) reacting the hydroxyl-functionalized CNTs with organofunctionalized silanols bearing "polymer-interacting" functional moieties to yield organosilane-functionalized polymer-interacting CNTs, wherein such organosilane-functionalized polymer-interacting CNTs are capable of chemical interaction with a polymer host material Organosilanes have been widely used for fiber-reinforced composites to improve the interface between fiber and polymer matrix. Silane coupling agents have the ability to form a durable bond between organic and inorganic materials mostly with one organic substituent and one to three hydrolyzable substituents. A silane coupling agent is at first hydrolyzed to produce silanol, which forms siloxane bond with the inorganic material on one side. On the other side, the functional groups (for example, vinyl, amino, chloro, epoxy, methacryloxy, etc.) readily react with suitable polymer matrices to form chemical bonds. Velasco-Santos et al. has demonstrated an organosilane treatment on multi-wall carbon nanotubes (MWNTs) using 3-mercaptopropyl trimethoxysilane [Velasco-Santos, C, Martinez-Hemandez, A. L, Lozada-Cassou, M., Alvarez-Castillo, A. and Castano, V. M. *Nanotechnology*, 13 (2002) 495-498]. In that work, an oxidation process was initially applied to produce hydroxyl groups on the nanotube surface (likely destroying the graphene sheet) and open-ends. A subsequent silanization process was then performed to yield functionalized nanotubes. In the case of the present invention, a sidewall functionalization method has been developed based on a functionalization with the hydroxyl group terminated moieties. [L. Zhang et al., *Chem. Mater.*, 2004, 16, 2055-2061] so that specific functional groups can be attached to nanotubes for polymer composites applications—without destruction of the "rolled-up" graphene sheet of which the carbon nanotube is comprised.

Carbon nanotubes (CNTs), according to the present invention, include, but are not limited to, single-wall carbon nanotubes (SWNTs), multi-wall carbon nanotubes (MWNTs), double-wall carbon nanotubes, buckytubes, fullerene tubes, tubular fullerenes, graphite fibrils, and combinations thereof. Such carbon nanotubes can be made by any known technique including, but not limited to, arc discharge [Ebbesen, *Annu. Rev. Mater. Sci.* 1994, 24, 235-264], laser oven [Thess et al., *Science* 1996, 273, 483-4873, flame synthesis (Vander Wal et al., *Chem. Phys. Lett.* 2001, 349, 178-184], chemical vapor deposition [U.S. Pat. No. 5,374,415], wherein a supported [Hafner et al., *Chem. Phys. Lett.* 1998, 296, 195-202] or an unsupported [Cheng et al., *Chem. Phys. Lett.* 1998, 289, 602-610; Nikolaev et al., *Chem. Phys. Lett.* 1999, 313, 91-97] metal catalyst may also be used, and combinations thereof. Depending on the embodiment, the CNTs can be subjected to one or more processing steps prior to fluorinating them and/or subjecting them to any of the chemistries of the present invention. In some embodiments, the CNTs are separated based on a property selected from the group consisting of chirality, electrical conductivity, thermal conductivity, diameter, length, number of walls, and combinations thereof. See O'Connell et al., *Science* 2002, 297, 593-596; Bachilo et al., *Science* 2002, 298, 2361-2366; Strano et al., *Science* 2003, 301, 1519-1522. In some embodiments, the CNTs have been purified. Exemplary purification techniques include, but are not limited to, those by Chiang et al. [Chiang et al., *J. Phys. Chem. B* 2001, 105, 1157-1161; Chiang et al., *J. Phys. Chem. B* 2001, 105, 8297-8301]. In some embodiments, the CNTs have been cut by a cutting process. See Liu et al., *Science* 1998, 280, 1253-1256; Gu et al., *Nano Lett.* 2002, 2(9), 1009-1013. In some embodiments, the CNTs are present as individual nanotubes, wherein other embodiments, the CNTs are present as ropes or bundes of individual CNTs. The terms "CNT" and "nanotube" are used synonymously herein.

In some embodiments, fluorinated carbon nanotubes ("fluoronanotubes"), generally comprising a stoichiometry of about $C_1F_{0.01}$ to about $C_2F$, are reacted with mono-metal salts of a dialcohol, MO—R—OH, where M is a metal and R is hydrocarbon (e.g., —(CH$_2$)$_n$—) or other organic chain and/or ring structural unit. In such embodiments, —O—R—OH displaces —F on the nanotube, the fluorine leaving as MF. Generally, such mono-metal salts are formed in situ by the addition of MOH to one or more dialcohols in which the fluoronanotubes have been dispersed. Preparation of such hydroxyl-functionalized CNTs is described in detail in commonly-assigned co-pending International Patent Application No. PCT/US2004/019015 entitled, "Sidewall Functionalization of Carbon Nanotubes with Hydroxyl-Terminated Moieties," filed Jun. 16, 2004, as well as in L. Zhang et al., *Chem. Mater.*, 2004, 16, 2055-2061.

The dialcohols can be any dialcohol in which fluoronanotubes can be dispersed, and with which the fluoronanotubes will react under appropriate conditions. Some exemplary chemical routes utilizing exemplary dialcohols are shown in FIG. 1A, wherein fluoronanotube 1 reacts with a mono-metal salt of a dialcohol generated by reacting any of dialcohols 2*a-e* with MOH, where M equals any of Li, Na, or K, to yield any of functionalized products 3*a-e*. Other exemplary dialcohols include bis-phenol A.

The above chemistry can be extended to multi-alcohols as well, as shown in FIG. 1B, wherein fluoronanotube 1 reacts with a mono-metal salt of a multi-alcohol $R(OH)_n$ generated by reacting multi-alcohols 2*f* with MOH, where M equals any of Li, Na, or K, to yield functionalized products 3*f*. Thus, the above description can be extended to reacting fluoronanotubes with any mono-metal salt of the general formula $MOR(OH)_{n-1}$. Again, R is any hydrocarbon or other organic chain and/or ring structural unit that can serve as a backbone for the functionalizing moieties.

In some embodiments, fluoronanotubes are reacted with amino alcohols, such as being of the type $H_2N$—R—OH, wherein —N(H)—R—OH displaces —F on the nanotube, the fluorine leaving as HF. Generally, in such embodiments, fluoronanotubes are dispersed in an appropriate amino alcohol to form a reaction mixture; a pyridine catalyst is added to the reaction mixture; and the reaction mixture+catalyst is allowed to react to form functionalized carbon nanotubes with amino (amine) terminated moieties. In some embodiments, ultrasonication is used to facilitate dispersion of the fluoronanotubes and/or induce mixing. In these or other embodiments, alternative mixing operations may be employed. Reactions generally take place for a duration that ranges from about 0.5 to about 5 hrs., and at a temperature that ranges from about 50 to about 150° C. As above, the preparation of such hydroxyl-functionalized CNTs is described in detail in commonly-assigned co-pending Intentional Patent Application No. PCT/US2004/019015 entitled, "Sidewall Functionalization of Carbon Nanotubes with Hydroxyl-Terminated Moieties," filed Jun. 16, 2004, as well as in L. Zhang et al., *Chem. Mater.*, 2004; 16, 2055-2061.

Figure 2:
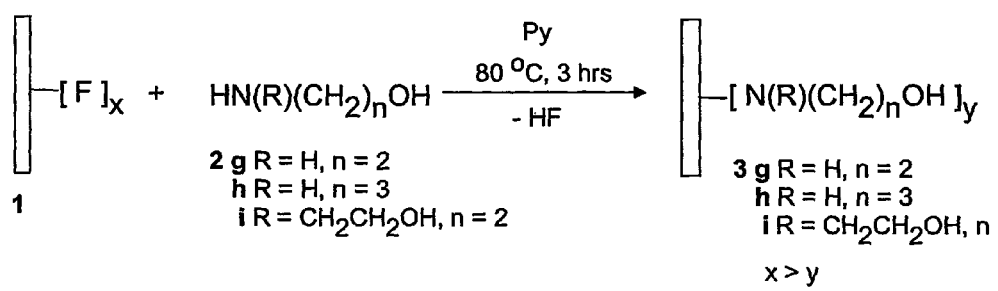
FIG. 2 depicts reactions between fluoronanotubes and amino alcohols 2 $g$-$l$ to form hydroxyl-functionalized carbon nanotubes 3 $g$-$l$ with amino-terminated moieties attached to their sidewalls.

The amino alcohols can be any amino alcohol in which fluoronanotubes can be dispersed, and with which the fluoronanotubes will react under appropriate conditions. Some exemplary chemical routes utilizing exemplary amino alcohols are shown in FIG. 2, wherein fluoronanotube 1 reacts with amino alcohols 2 *g-l* to form functionalized carbon nanotubes 3 *g-l* with amino-terminated moieties attached to their sidewalls.

Once hydroxylated, CNTs can undergo reaction with a silanol species of the general type:

$$HO—Si(R^1)(R^2)(R^3)$$

where each of $R^1$-$R^3$ is a functional moiety that can be selected from the group consisting of hydrogen (H), hydroxyl (OH), thiol (SH), saturated and unsaturated aliphatic hydrocarbons, cycloaliphatic hydrocarbons, aromatic hydrocarbons, amines, amides, esters, ethers, epoxies, silyl, germyl, stannyl, and combinations thereof. Generally, at least one of $R^1$-$R^3$ is a "polymer interacting" moiety capable of interacting with some type of polymer matrix through covalent or other type of bonding (e.g., hydrogen bonding, van der Waals forces, dipole-dipole interactions, etc.).

In some embodiments, such silanol species are formed via the hydrolysis of siloxane species of the type:

$$RO—Si(R^1)(R^2)(R^3)$$

wherein:

$$RO—Si(R^1)(R^2)(R^3)+H_2O \rightarrow HO—Si(R^1)(R^2)(R^3)+ROH$$

where R is a hydrocarbon functionality.

Such silanol species are reacted with hydroxyl-functionalized CNTs according to the following reaction Scheme 1:

Scheme 1

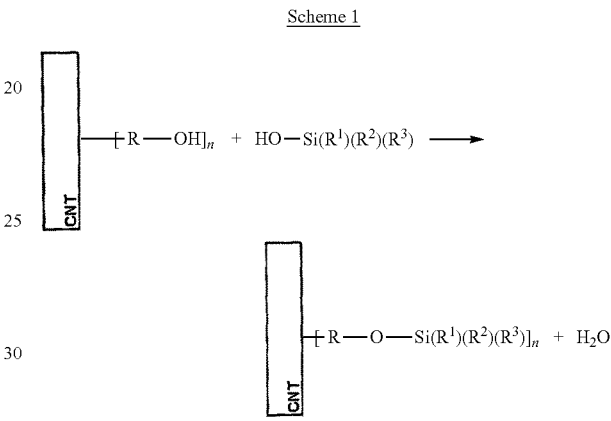

The above-described chemistry is termed "silation" herein, and the products of such silation are termed silane-functionalized CNTs herein. Generally, any CNT bearing hydroxyl moieties could be used in this silation step.

Additionally or alternatively, in some embodiments, a chlorosilane species can be used in lieu of the silanol. Typically, a catalyst such as pyridine is used to facilitate such reactions—as shown in Scheme 2:

Scheme 2

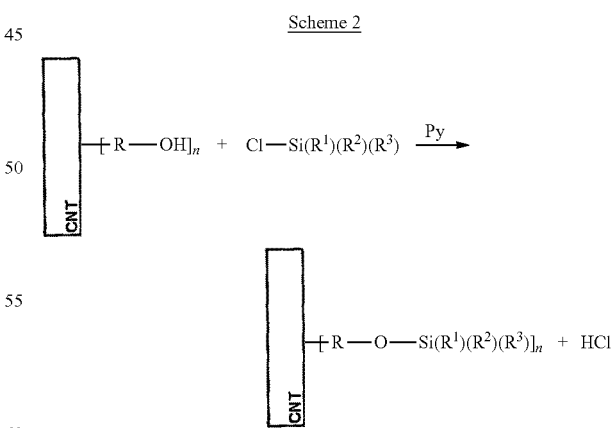

In some embodiments, where at least one of $R^1$-$R^3$ on the silane functionalized CNTs is a polymer interacting moiety, the silane-functionalized CNTs are mixed with suitable polymer precursor that is subsequently polymerized in situ with the silane-functionalized CNTs. In some embodiments, wherein the polymer precursors are epoxy precursors, at least one of $R^1$-$R^3$ is selected from the group consisting of amines, epoxide rings, carboxylic acids, thiols, isocyanates and combinations thereof, so as to covalently integrate with the resulting epoxy matrix when cured.

In some or other embodiments, at least one of $R^1$-$R^3$ on the silane functionalized CNTs is a polymer interacting moiety comprising a functionality selected from the group consisting of alkenes, alkynes, dienes, thiols, isocyanates and combinations thereof. In some such embodiments, the silane-functionalized CNTs are mixed with polymer precursors comprising double or triple carbon-carbon bonds. Such polymer precursors include, but are not limited to, styrene, vinyl ester, isoprene, butadiene, acrylonitrile, polyester, and combinations thereof. Such mixtures are then polymerized in situ, resulting in covalent interaction of the silane-functionalized CNTs with the resulting polymer. Typically, such polymerizations rely on a polymerization mechanism selected from the group consisting of free-radical (e.g., AIBN initiated), cationic, anionic, and combinations thereof. In some embodiments, such polymerization is initiated by a method selected from the group consisting of light, catalyst, heat, and combinations thereof. Exemplary polymer systems in which to incorporate silane-functionalized CNTs are vinyl esters, epoxies, and polyesters.

In some embodiments, silane functionalized CNTs are blended into a thermoplastic material. Suitable thermoplastic materials include, but are not limited to, polystyrene, polyethylene, polypropylene, and combinations thereof.

In embodiments where silane-functionalized CNTs comprising polymer interacting moieties are mixed with polymer species, there is polymer interaction between the functionalized CNTs and the polymer matrix which involves covalent bonding and/or an interaction selected from the group consisting of hydrogen bonding, van der Waals attractive forces, dipole-dipole interactions, and combinations thereof. In such embodiments, the CNTs are generally present in the resulting composite in an amount that ranges from about 0.1 weight percent to about 10 weight percent. In such embodiments, the CNTs are typically debundled (exfoliated) to an extent not possible with unfunctionalized CNTs. Furthermore, the silane chemistry described herein extends the range of systems into which such exfoliated CNTs can be integrated by virtue of the diversity of polymer-interacting moieties which can be appended to the CNTs via such chemistry.

In some embodiments, the methods of the present invention are integrated with fiber-reinforced polymeric (FRP) composites. FRP composite manufacturing methods typically involve placing a fiber reinforcement into a mold and then impregnating the fiber with uncured polymer so that the material can be shaped into the final part after curing. To fabricate nanotube/fiber reinforced polymer composites, dry reinforcement fiber is overcoated first with nanotubes, and then fabricating composites with standard lay up and resin infusion processing. This method avoids significant viscosity increase resulting from directly mixing nanotubes into the resin, and therefore, facilitates the widely-used industrial resin transfer molding and infusion processing for FRP composites manufacturing. Applicants have fabricated nanotube (e.g., SWNT) enhanced FRP composites with woven fiberglass using vacuum assisted resin transfer molding (VARTM), compression molding, and vacuum bagging processing. This procedure is also suitable for most other molding methods for FRP composites such as wet lay up, spray molding, prepreg, autoclave, conventional resin transfer molding (RTM) and its derivative processing such as Seeman's composite resin injection molding process (SCRIMP), double-chamber vacuum resin transfer molding (DCVRTM), structural reaction injection molding (SRIM) etc.

Using such above-described FRP techniques, Applicants have processed nanotube/glass fiber composites with epoxy, vinyl ester, and Bismaleimide resin systems. This nanotube overcoating method can be also extended to any other thermosetting resin systems (e.g., polyester). Suitable reinforcements include, but are not limited to, discontinuous or continuous fibers, clays, fiberglass fabric, carbon fiber, graphite fabric, KEVLAR fabric, and combinations thereof. Reinforcements can be in the form of woven fabrics or non-woven fabrics (e.g., mats), or chopped fibers.

In some of the above embodiments involving FRP, a spray-up process is used to spray-deposit a mixture of nanotubes (dispersed in one or more solvents) onto the surface of a woven fabric or mat, and later in a mode to facilitate the molding methods for FRP composite manufacturing. After the evaporation of solvent(s), nanotubes remain overcoated on the fiber weave surface in a uniform distribution or according to prescribed placement. Combining into consolidated composites, nanotubes serve as secondary reinforcement to enhance properties of laminated composites structures, such as toughness, interlaminar shear strength, compression strength, etc.

Silane-Functionalized CNT/Polymer/Glass Fiber Composites

The present invention is also directed to silane-functionalized CNT/polymer/glass fiber composites and methods of making same. Such composites generally comprise the following elements: 1) CNTs; 2) a fiber reinforcement material; and 3) polymer, wherein the CNTs serve as a bridge, chemically or physically binding the fiber reinforcement material with the polymer.

Methods for making such composites generally comprise the steps of: 1) providing a fiber reinforcement material; 2) adding CNTs to the fiber reinforcement material to form CNT-coated fibers; and 3) contacting polymer material to the CNT-coated fibers to form a composite material wherein the CNTs serve as a bridge, chemically or physically binding the fiber reinforcement material with the polymer.

Generally, the CNTs used in these embodiments are SWNTs, but variations can be employed wherein MWNTs and a wide variety of fibers are employed.

In some embodiments, an incipient wetting process is used to coat the reinforcing fibers with CNTs. This generally involves dispersal of CNTs in a solvent, addition of fibers, and the removal of the solvent to yield reinforcing fibers coated with CNTs. In some embodiments, the CNTs are functionalized and covalently bound to the reinforcing fibers. In some embodiments, the CNTs are used as sizing agents for the reinforcing fibers. In some embodiments, such "sizing" is put on pristine fibers or on fibers where the original sizing was removed.

Figure 3:
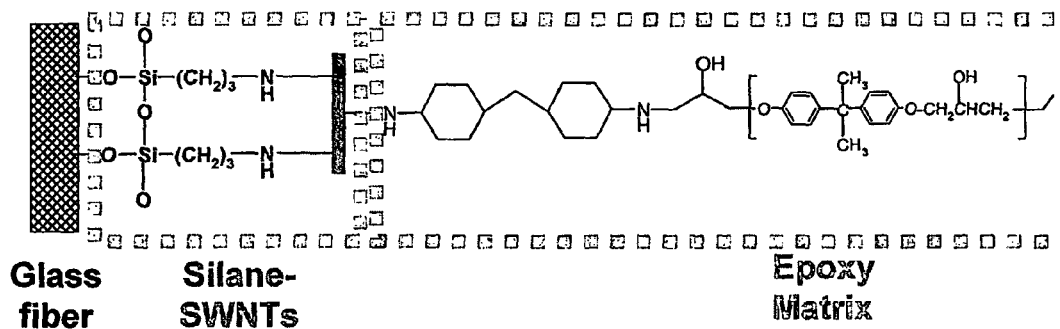
FIG. 3 is a schematic diagram of SWNTs bridging both polymer matrix and glass fiber.

In some of these embodiments, as a method to improve dispersion, CNTs, such as SWNTs, are initially introduced not in a polymer matrix, but directly onto fiber reinforcements (e.g., glass fibers). In such embodiments, the silane-functionalized CNTs are ultimately chemically interconnected (bound) to both a polymer matrix and the fiber reinforcements as shown in FIG. 3, wherein a silane-functionalized SWNT serves as a chemical "bridge" between a glass fiber and an epoxy matrix. In such embodiments, processes free of viscosity control and solvent can be used to contact polymer material with the fiber reinforcement. In some embodiments, fluorinated CNTs (e.g., as in commonly-assigned U.S. Pat. No. 6,645,455) are introduced on the fiber reinforcement surface by chemical reactions with silane agents bearing amine functional groups. In some embodiments, this provides for a functionally graded interface.

In some of the embodiments relating to silane-functionalized CNT/polymer/glass fiber composites, epoxies are used as the polymer component. As above, epoxies, according to the present invention, are crosslinked polymeric species, wherein crosslinking occurs between epoxy resin species, comprising epoxide groups, and curing agents comprising amino groups, anhydride groups, or Lewis acid type groups. The process of crosslinking is termed "curing." The epoxy systems (epoxy resin+curing agent) can be any system or combination of systems that suitably allow for the covalent integration of CNTs in accordance with the methods of the present invention.

As mentioned above, in some embodiments glass fiber fabric is used as the reinforcing fiber. While not intending to be limiting, such fiber reinforcements typically have a weight-per-surface area of ~339 g/m$^2$, thickness of 0.36 mm, 16×14 plain weave. Each strand of such fibers is composed of 245 fine glass fiber fibrils (10 µm diameter).

Figure 4:
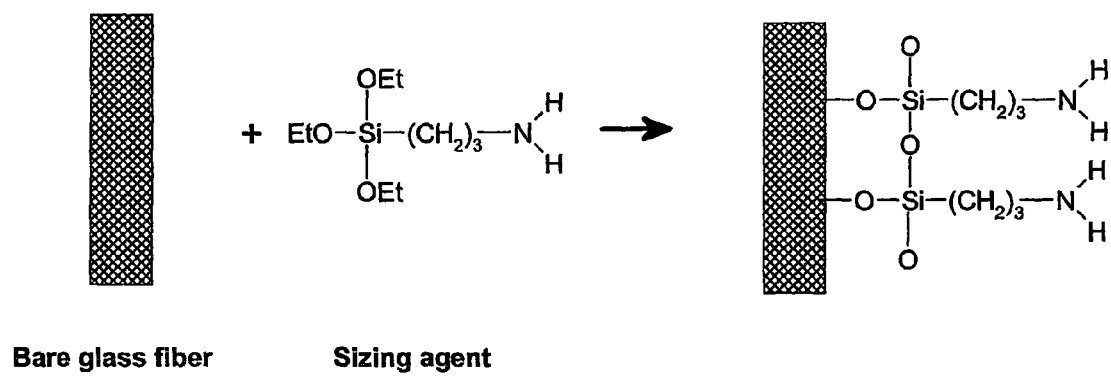
FIG. 4 is a schematic diagram depicting the sizing of glass fiber with an amine-silane agent.

In some embodiments utilizing glass fiber reinforcements, the glass fiber fabrics are resized. Silane on the as-received glass fiber is removed by heat cleaning, and replaced with a chemically active silane agent such as a silane coupling agent bearing an amine group. Such a process is shown schematically in FIG. 4. Aqueous alcohol solutions (e.g., 95% ethanol-5% water) are typically used to facilitate hydrolysis reactions to introduce a 2% addition of new silane agent on the glass fiber. About five minutes are allowed for hydrolysis and silanol formation. Silane sized glass fiber fabrics are dried at 100° C. for 2 hr.

Figure 5:
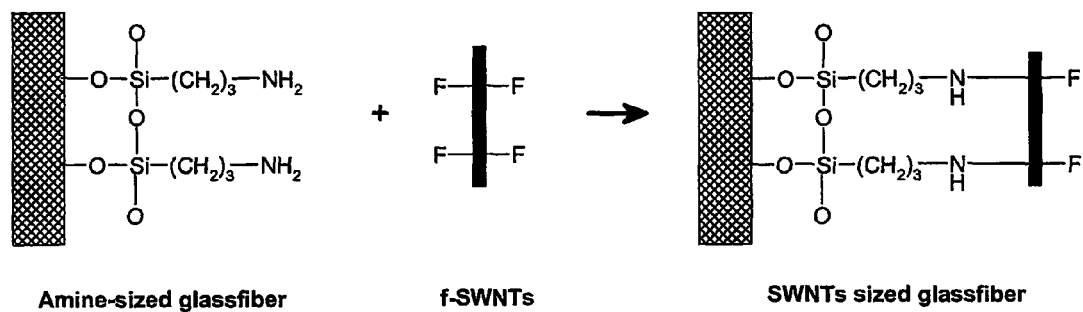
FIG. 5 is a schematic diagram depicting the chemical bonding between fluorinated SWNTs and aminosilane functionalities on glass fiber.

In some embodiments of the present invention, silane-resized glass fiber fabrics are chemical bonded to fluorinated SWNTs. Such reactions are typically carried out in dimethyl formamide (DMF) at 80° C. for 1 hr. In such reactions, the amine groups attached to the silane coupling agent on the glass fiber are typically primary amines that will react with the fluorines on the CNT sidewall and form C—N bonds to the nanotube sidewall. This coupling reaction is shown schematically in FIG. 5. Hydrogen fluoride (HF) generated during such reactions is captured in salt form by pyridine.

Figure 6:
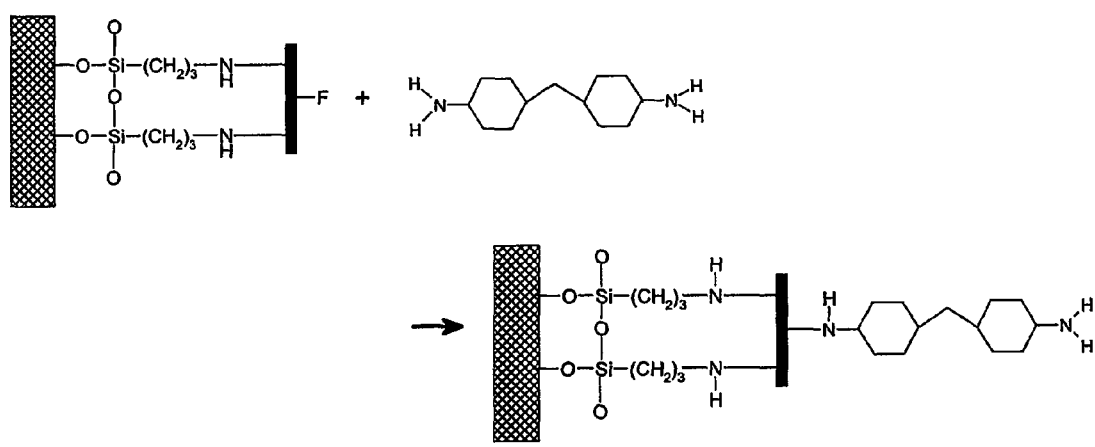
FIG. 6 is a schematic diagram of chemical bonding between extra fluorine sites on SWNTs and curing agent.

In some embodiments of the present invention, there exist some unreacted fluorine sites on CNTs, even after coupling them to the glass fibers, since there are typically more fluorine sites on the CNTs than amine groups on the silane-coated attached to glass fiber. These fluorine sites can also react with curing agent in an epoxy matrix, as shown in FIG. 6. Amine groups in the curing agent are reacted with these extra fluorine sites on SWNTs.

Figure 7:
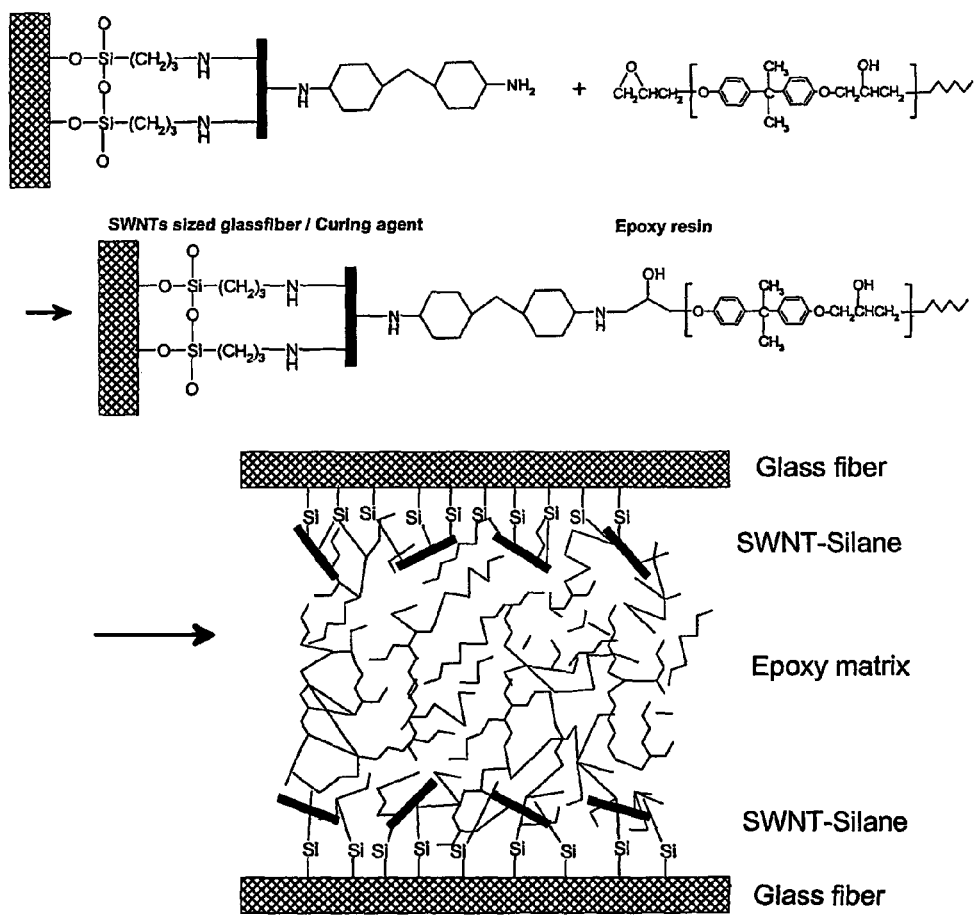
FIG. 7 is a schematic diagram of chemical bonding between glass fiber-silane-SWNTs and epoxy resin (in an epoxy matrix)

In some embodiments of the present invention, silane-functionalized CNT/polymer/glass fiber composites are prepared by embedding epoxy resin into multiple (e.g., 7) layers of silane-functionalized SWNT/glass fiber fabrics. Such silane-functionalized CNT/epoxy/glass fiber composites are typically cured at 100° C. for 2 hours and post-cured at 150° C. for 2 hours. Such chemical bonding between stacked glass fiber layers, SWNTs, and epoxy polymer is shown in FIG. 7.

Figure 8:
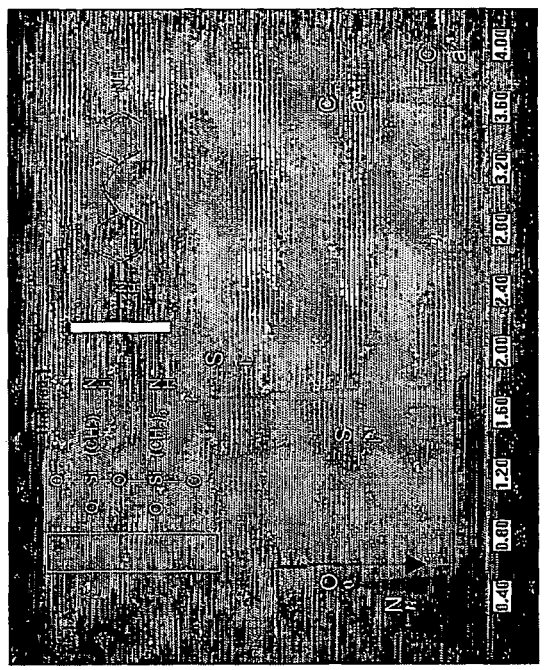
FIG. 8 depicts an SEM micrograph of the glass fiber-silane-SWNTs (left) and an EDAX surface analysis result (right)
Figure 8:
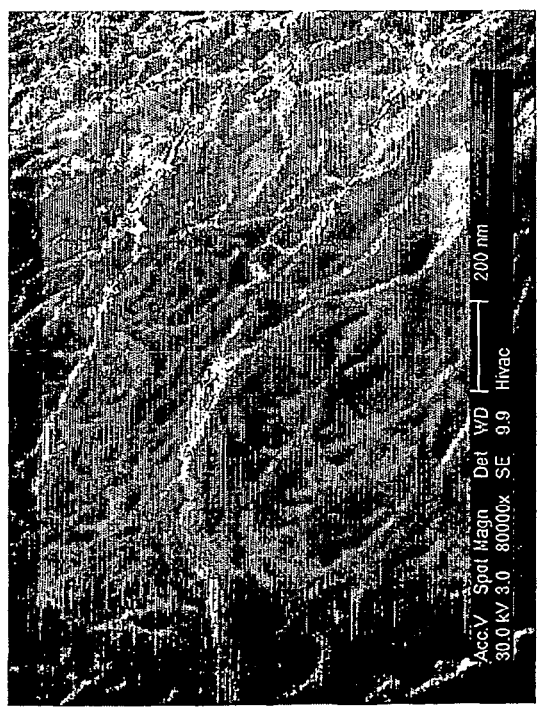

Surface elemental analysis was acquired with EDAX (energy dispersive analysis of X-rays) to confirm the presence of silane functionalities on silane-functonalized CNTs. From scanning electron microscopy (SEM) micrographs, silane-functionalized SWNTs bundles are seen to overcoat glass fiber surfaces. Using SEM, SWNTs on glass fiber were imaged and analyzed in this region using EDAX. From this result, it is confirmed that silane groups are introduced on glass fiber-SWNTs. FIG. 8 shows an SEM micrograph of the glass fiber-silane-SWNTs (left), and an EDAX surface analysis result (right).

Figure 9:
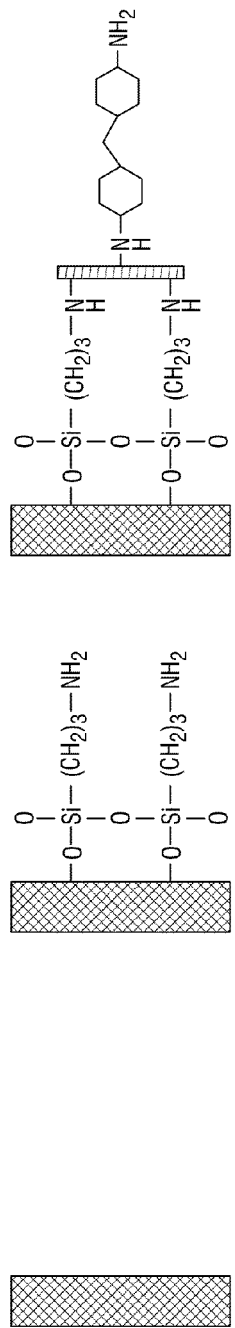
FIG. 9 depicts SEM micrographs of fracture surface after a 3-point bend test; wherein top images represent each chemical structure on the surface, middle images represent the fractured surface, and bottom images represent the glass fiber-silane-SWNTs-epoxy interface; and wherein (a) is a standard sample without any silane treatment, (b) is a sample that is silane only treated, and (c) is a sample that is treated with silane-SWNTs.
Figure 9:
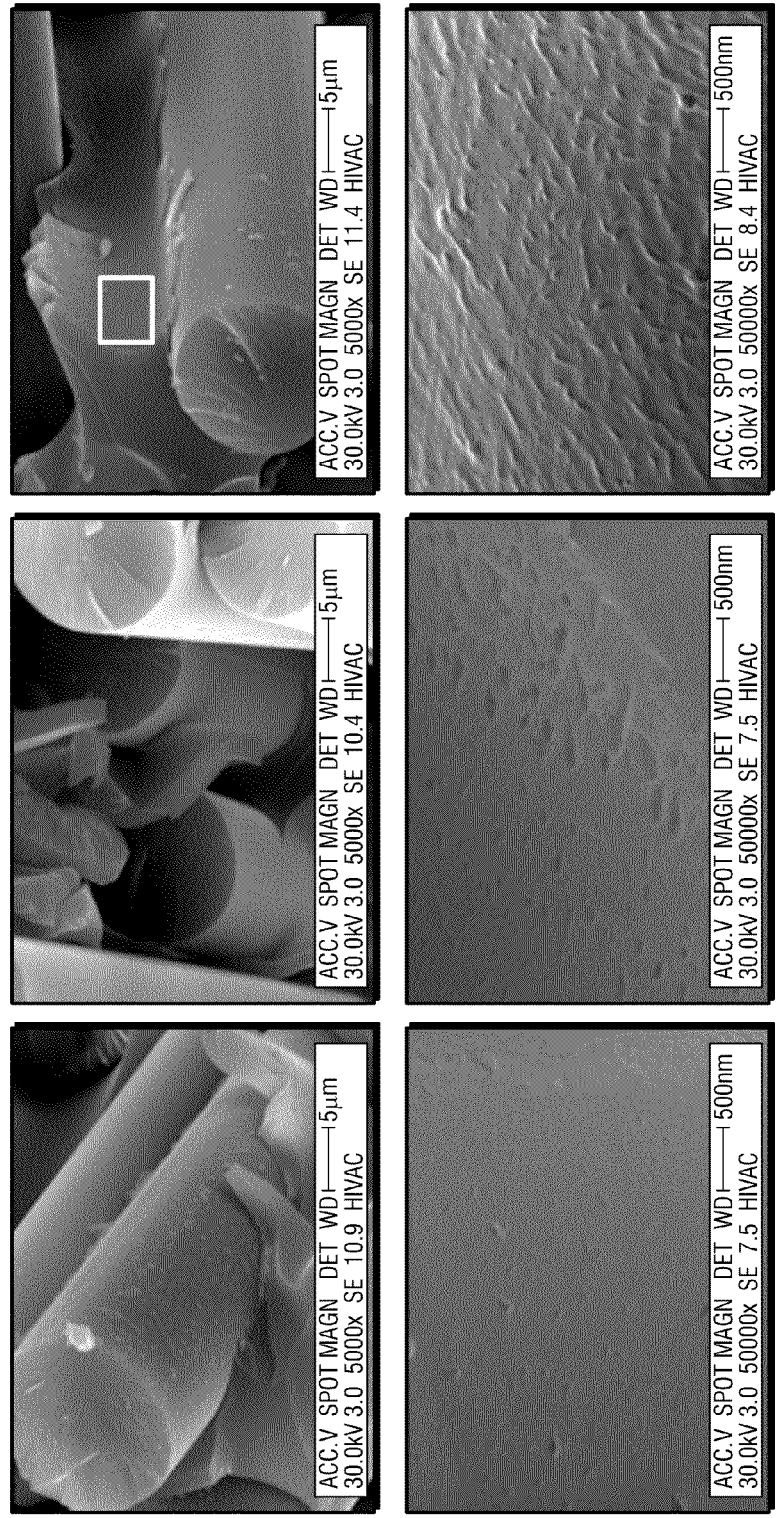

To evaluate the effect of chemically-bound SWNTs on the sizing of the glass fiber, a series of samples can be prepared. Standard samples are prepared by sizing glass fiber/epoxy composites. In a particular instance of general relevance, amine group terminated silane-coated glass fiber/epoxy composites and SWNT-coated glass fiber/epoxy composites were prepared and compared. Flexural strength tests were performed with at least 5 samples using a 3-point bend test fixture, according to the ASTM D709 standard. Referring to FIG. 9, top SEM micrographs are the fracture surface after 3-point bend tests, bottom SEM micrographs are the interface between epoxy matrix and glass fiber after glass fibers have been pulled out. The samples are identified as: (a) a standard sample without any silane treatment, (b) Silane only treated, and (c) Silane-SWNTs.

Figure 10:
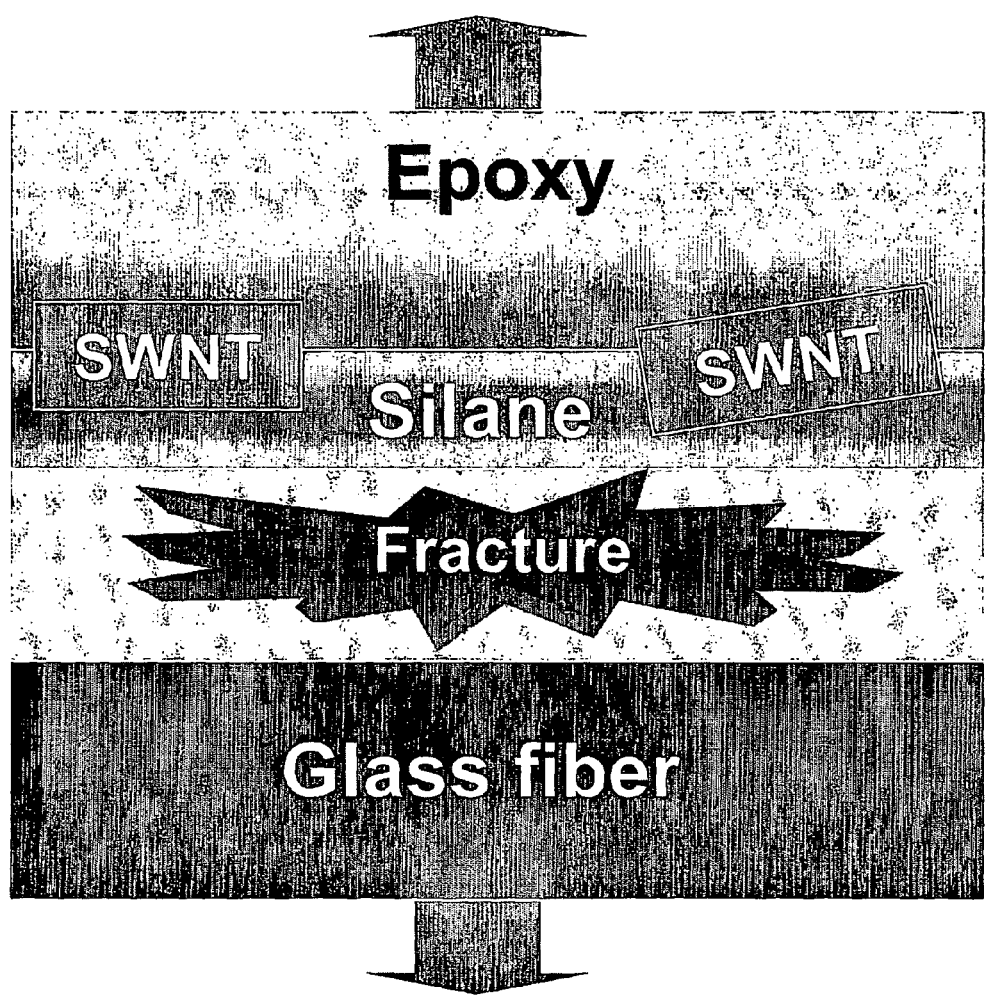
FIG. 10 is a schematic representation of fracture failure showing fracture between silane and glass fiber.

In some analyses, SEM micrographs clearly show that SWNTs exist at the interface between glass fiber and epoxy matrix. From the flexural test results, amine-group-terminated silane-coated glass fiber/epoxy composites showed the best strength and modulus. From literature, desized glass fiber has higher electrostatic energy, and higher surface energy than sized glass fiber. After sizing, the surface energy drops about 30%. Considering losing surface energy by sizing, chemically-modified SWNTs/sized glass fiber composites likely possess enhanced mechanical properties. It is believed that such failure occurs at the glass fiber/silane interface. FIG. 10 is a schematic representation of fracture failure between the glass fiber/silane interface, wherein the glass fibers were not pre-treated to enhance surface OH groups prior to resizing.

Silane-Functionalized Oxidized SWNTs (Hybrid SWNTs-Si—NH$_2$/SWNTs-Si-Epoxide)

In some embodiments, as a key method to functionalize SWNTs, various organosilane groups are chemically bonded to oxidized SWNTs. These silane-functionalized SWNTs can be used in various polymer systems, including paints and composites.

In some embodiments of the present invention, silane groups are attached to oxidized SWNTs, the oxidized SWNTs having been prepared by sonication in a mixture of oxidizing acid (e.g., H$_2$SO$_4$ or HNO$_3$). Amine groups attached to a first silane coupling agent, and epoxide groups attached to a second silane coupling agent are reacted with hydroxyl and carboxyl groups on the oxidized SWNTs (generally on the ends or as defects in the sidewalls) to yield aminosilane-functionalized SWNTs (amine-Si-SWNTs) and epoxysilane-functionalized SWNTs (epoxide-Si-SWNTs).

Figure 11:
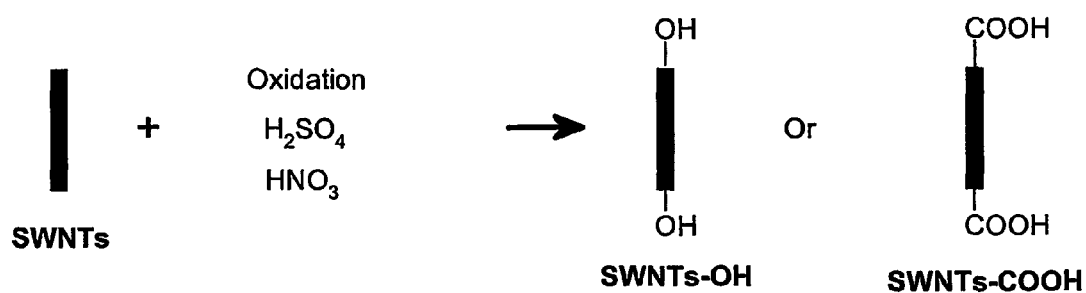
FIG. 11 depicts hydroxyl and carboxylic group introduction by acid treatment.

In some embodiments, SWNTs are oxidized to attach hydroxyl or carboxyl groups on SWNTs (generally on the tube ends) that will then be reacted with alkoxy groups in silanes. In one example, 0.5 g of unpurified SWNTs was dispersed in 400 ml of HNO$_3$/H$_2$SO$_4$ (3:1), sonicated with a bath sonicator for 3 hours. Excess amounts of distilled water were added to dilute the mixture which was then centrifuged. About 50 ml of this mixture was then filtered through a 0.2 µm TEFLON membrane by adding 100 ml of distilled water and acetone to make it in buckypaper form. Samples were dried at 100° C. for 24 hours. FIG. 11 illustrates such oxidation schematically.

Silane-Functionalized Oxidized SWNTs (SWNTs-Si—NH$_2$)

Figure 12:
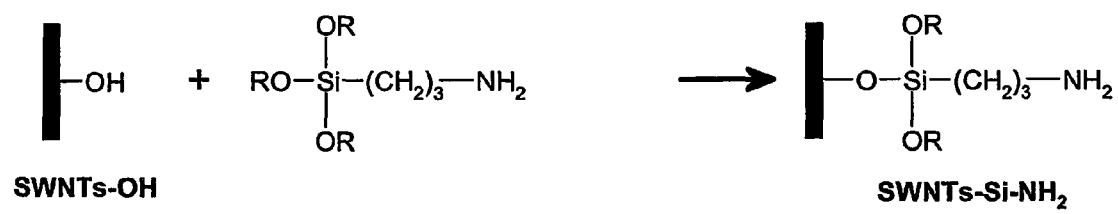
FIG. 12 is a schematic representation of $NH_2$—Si-SWNTs prepared by reaction of hydroxyl-functionalized SWNTs (SWNTs-OH) with aminosilane ($NH_2$-silane) species.
Figure 13:
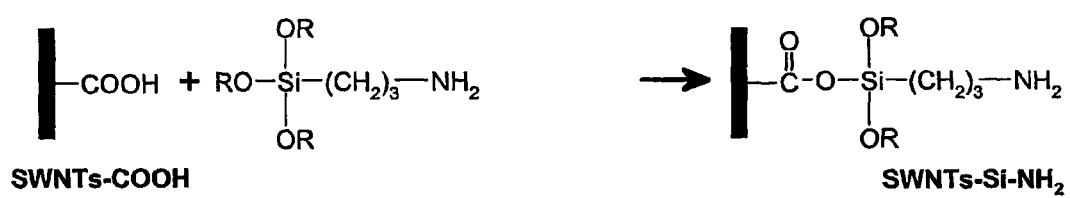
FIG. 13 is a schematic representation of $NH_2$—Si-SWNTs preparation by reaction of carboxyl-functionalized SWNTs (SWNTs-COOH) with $NH_2$-silane.
Figure 14:
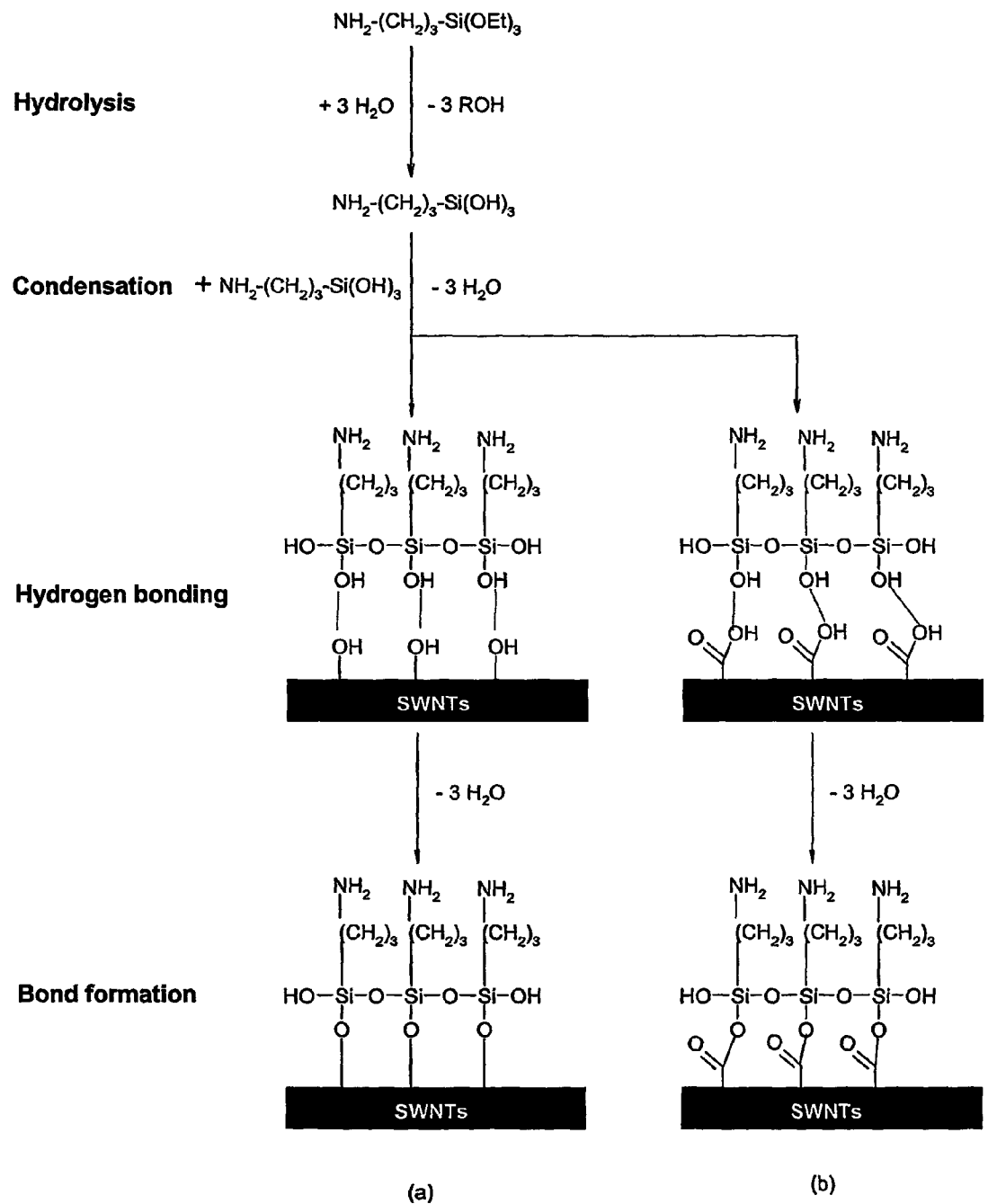
FIG. 14 illustrates a mechanism of amine-silane (aminosilane) deposition on (a) HO-SWNTs and on (b) HOOC-SWNTs.

In some embodiments, silane (3-aminopropyltriethoxysilane) was added with stirring to an ethanol/water mixture to yield a 2% final silane concentration in a 95% ethanol-5% water solution. Five minutes are typically allowed for hydrolysis and silanol formation. Oxidized SWNTs, SWNTs-COOH or —OH, are then dispersed into the solution, and sonicated, after which they are rinsed free of excess materials by ethanol. SWNTs-COOH can then be silylated by stirring them in solution for 2-3 minutes and then decanting the solution to yield silated SWNTs, SWNTs-Si-amine. SWNTs-Si-amine are then typically rinsed with ethanol though 0.2 μm TEFLON filter membrane. SWNTs-Si-amine can be also prepared by reaction between SWNTs-COOH and an amine-silane, as shown in FIG. 12, showing $NH_2$—Si-SWNTs preparation by reaction of SWNTs-OH with $NH_2$-silane, and FIG. 13, showing $NH_2$—Si-SWNTs preparation by reaction SWNTs-COOH with aminosilane ($NH_2$-silane). Additionally, FIG. 14 illustrates a mechanism of amine-silane bond formation with (a) SWNTs-OH and (b) SWNTs-COOH.

Figure 15:
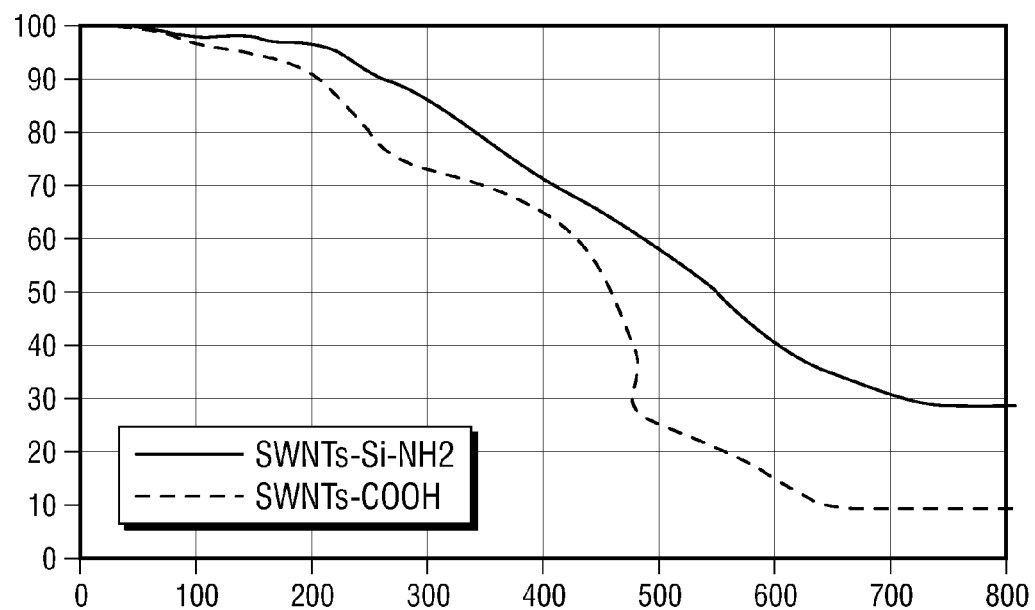
FIG. 15 depicts a TGA thermogram of aminosilane-functionalized SWNTs (SWNTs-silane-amine)

In some embodiments, thermogravimetric analysis (TGA) is used to confirm attachment of silane species to SWNTs. In one such relevant instance, a thermogram showed that the weight of ash increased for silane-functionalized SWNTs when compared with SWNTs, since silicons in 3-aminopropyltriethoxysilane were attached to the SWNTs. Results showed that SWNTs-Si-amines (3-aminopropyltriethoxysilane: trifunctional amine) were like powder in their dry state. From SEM micrographs, silanized SWNTs became thicker and produced hard, tiny particles after drying, forming a network structure during the condensation reaction. FIG. 15 depicts a TGA thermogram of SWNTs-silane-amine.

J. G. Iglesias et al. have reported that monoethoxysilanes (3-aminopropyidimethylethoxysilane) showed better mechanical properties than triethoxy silanes (3-aminopropyltriethoxysilane) when used to modify the surface of glassfibers. [Iglesias et al., *J. Colloid and Interface Sci.*, 2002, 250, 251-260]. Triethoxysilane formed cross-linked networks on the surface of the glass fiber. The more accessible the amine groups were, the higher the crosslinking density was. If monoethoxy (e.g., Compound 1) or diethoxy (Compound 2) is used, the crosslinking problems such as SWNTs-Si-amine/SWNTs-COOH or between SWNTs-Si-amines can be resolved.

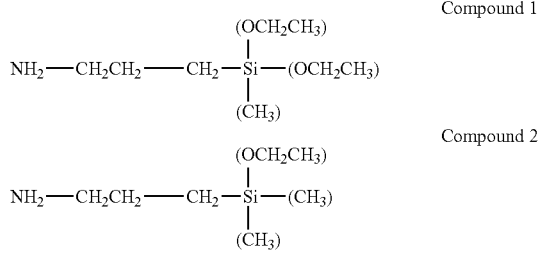

Silane-Functionalized Oxidized SWNTs (Hybrid SWNTs-Si—$NH_2$/SWNTs-Si-Epoxide)

Figure 16:
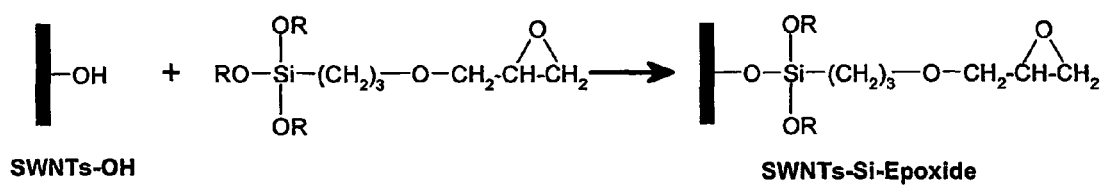
FIG. 16 is a schematic representation of epoxysilane-functionalized SWNTs (epoxide-Si-SWNTs) prepared by reaction of SWNTs-OH with epoxy-silane.
Figure 17:
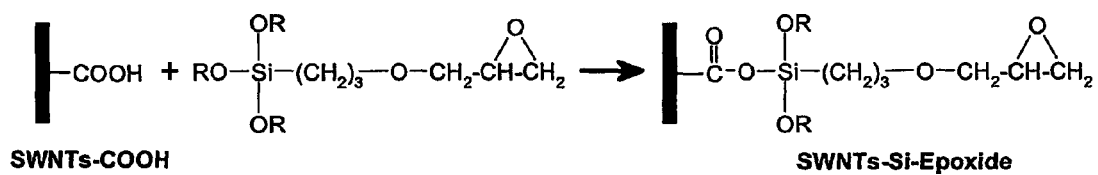
FIG. 17. is a schematic representation of epoxide-Si-SWNTs prepared by reaction of SWNTs-COOH with epoxy-silane.
Figure 18:
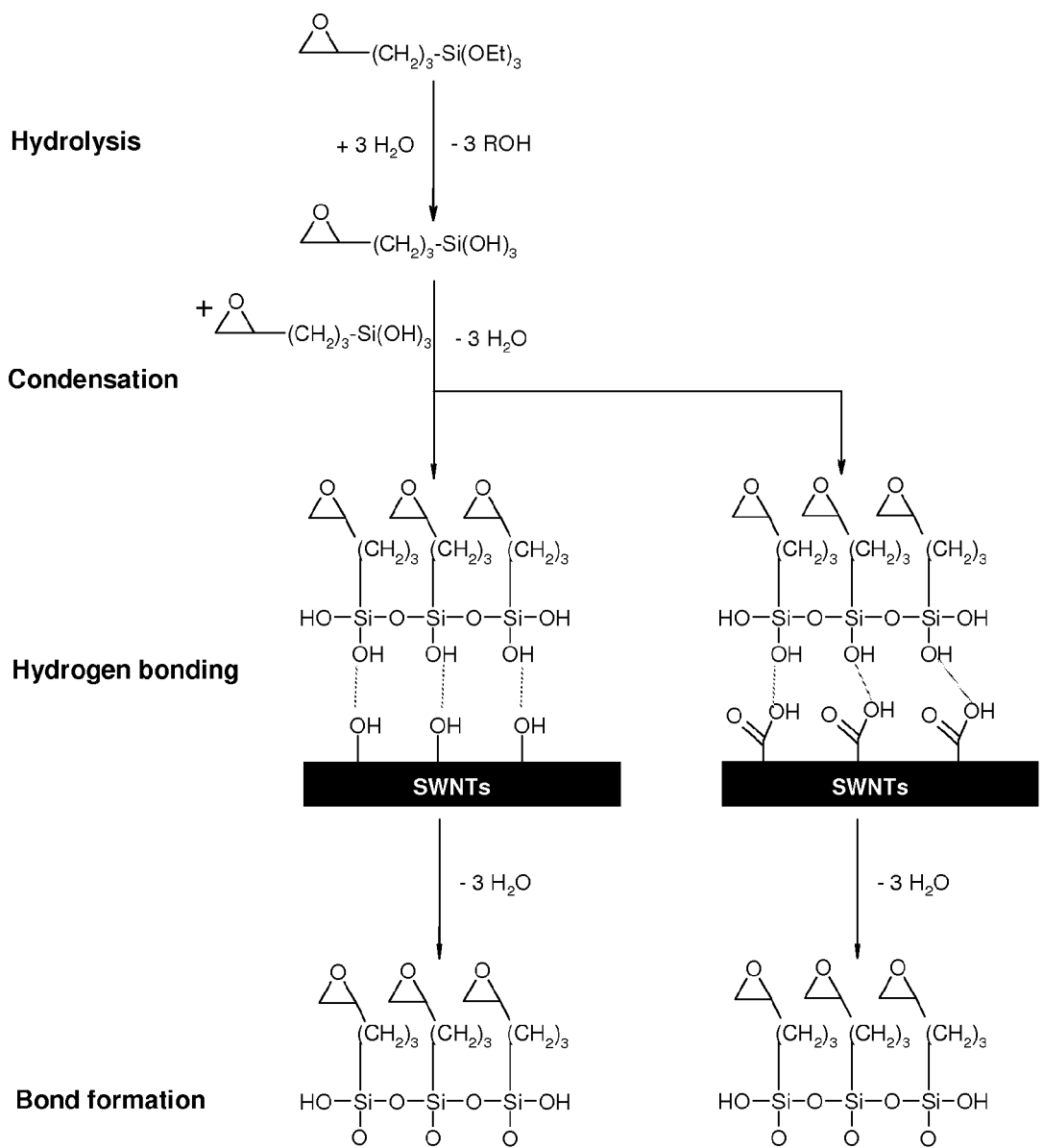
FIG. 18 depicts a mechanism of epoxide-silane coupling with HO-SWNTs (a) and with HOOC-SWNTs (b)

In some embodiments, aqueous alcohol solutions (e.g., 95% ethanol-5% water solution) will be adjusted to pH ~4.5-5.5 with acetic acid. Silane will be added with stirring to yield a 2% final concentration. Five minutes should be allowed for hydrolysis and silanol formation. SWNTs-COOH will then be dispersed in the solution, sonicated, and removed after 1-2 minutes. They will be rinsed free of excess materials by dipping briefly in ethanol. SWNTs-COOH will then be redispersed in the silane-alcohol solution and silylated by stirring them in said solution for 2-3 minutes and then decanting the solution. Cure of the silane will be for 5-10 minutes at 110° C. or for 24 hours at room temperature (<60% relative humidity). SWNTs-Si-epoxide can be prepared by reaction between SWNTs-OH and epoxide-silane, as shown in FIG. 16. SWNTs-Si-epoxide can be also prepared by reaction between SWNTs-COOH and epoxide-silane, as shown in FIG. 17. FIG. 18 illustrates a mechanism of epoxide-Silane deposition on (a) SWNTs-OH and on (b) SWNTs-COOH.

Figure 19:
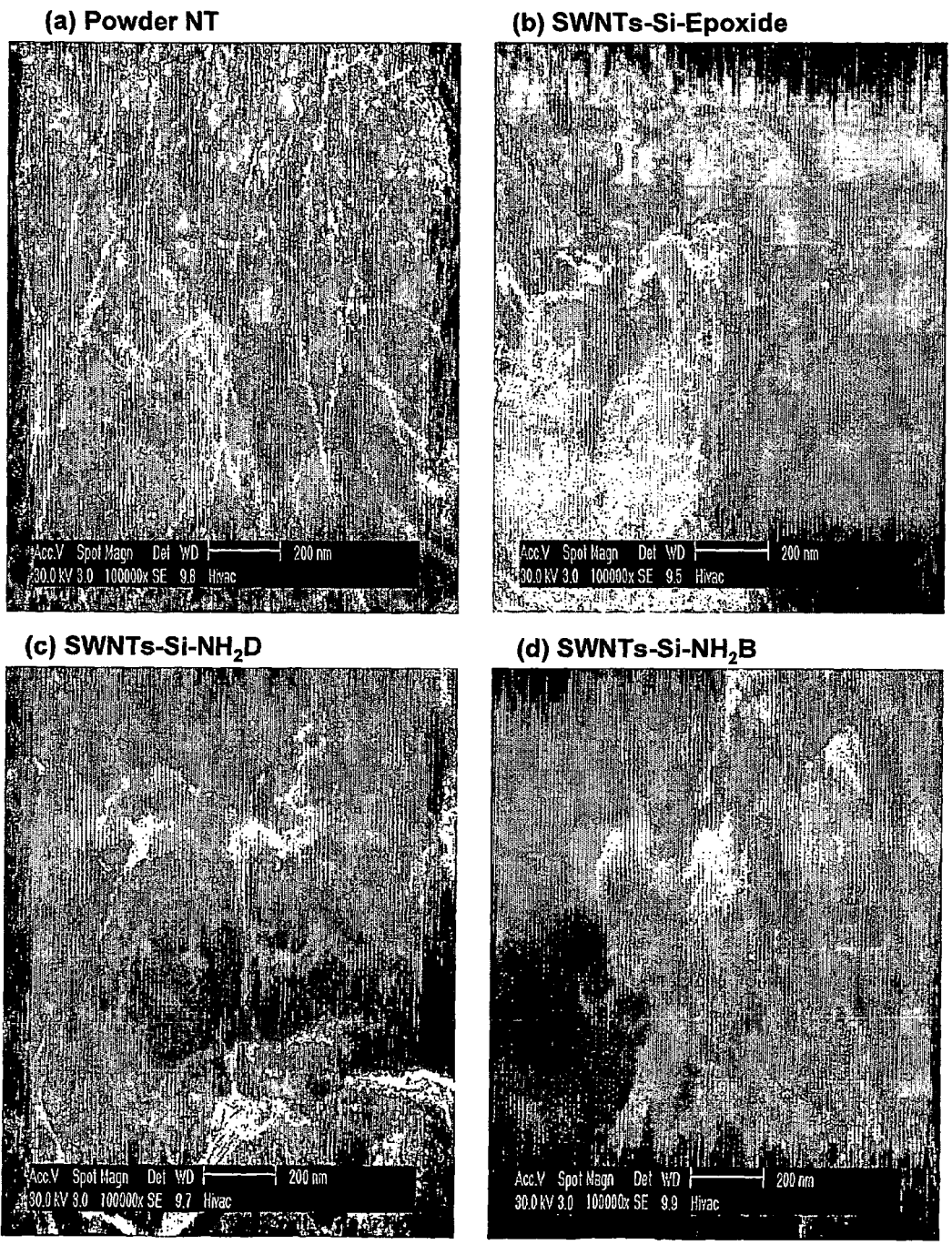
FIG. 19 depicts SEM micrographs of (a) untreated SWNTs, (b) SWNTs-Si-epoxide, (c) SWNTs-Si-amine D (diethoxy), and (d) SWNTs-Si-amine B (triethoxy)

In some instances, it can be seen from SEM micrographs that, compared with as-received SWNTs, amine-silane-SWNTs are interwined together with increased bundle thickness and roughness. FIG. 19 depicts SEM micrographs of (a) untreated SWNTs, (b) SWNTs-Si-epoxide, (c) SWNTs-Si-amine D (diethoxy), and (d) SWNTs-Si-amine B (triethoxy).

Silane-Oxidized SWNTs (Hybrid SWNTs-Si-Epoxide)

Figure 20:
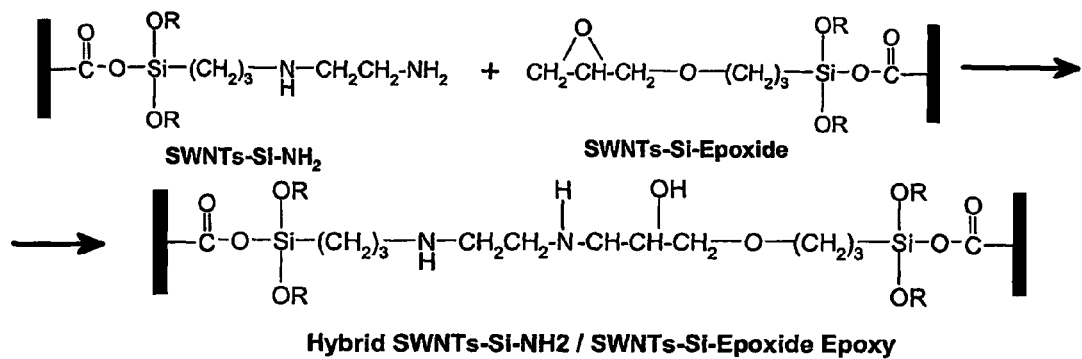
FIG. 20 is a schematic representation of the formation of hybrid SWNTs-Si—NH$_2$/SWNTs-Si-epoxide

In some embodiments, hybrid SWNTs-Si—$NH_2$/SWNTs-Si-epoxide epoxy can be made by reaction between SWNTs-Si—$NH_2$ and SWNTs-Si-epoxide epoxy. This is illustrated in FIG. 20.

Silane-Functionalized Oxidized SWNTs (SWNTs-Si—$NH_2$/Epoxide with Epoxy Prepolymer)

Figure 21:
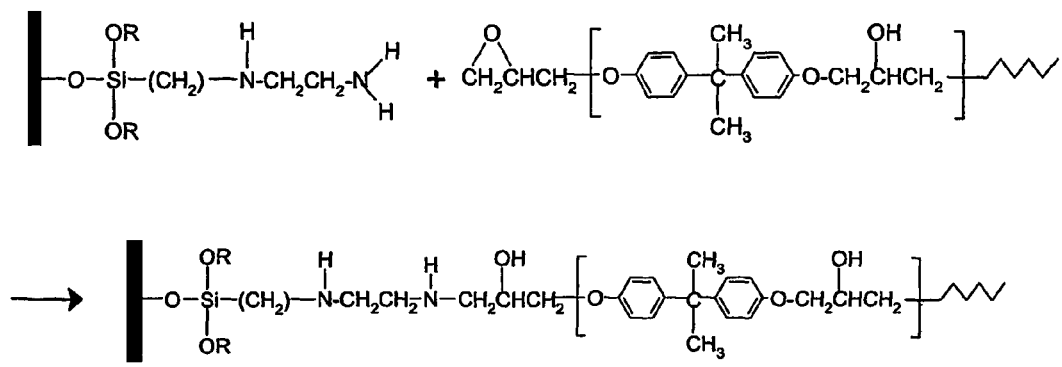
FIG. 21 is a schematic representation of a reaction of SWNTs-Si-amine with epoxy prepolymer.

In some embodiments, the amount of SWNTs-Si—$NH_2$ can be controlled by reaction in excess solvent/epoxy prepolymer. SWNTs-Si—$NH_2$ can be used if the SWNTs have epoxide groups in the prepolymer. FIG. 21 is a schematic representation of reaction of SWNTs-Si-Amine with epoxy prepolymer.

Silane-Functionalized Oxidized SWNTs (SWNTs-Si-Epoxide/Amine Curing Agent)

Figure 22:
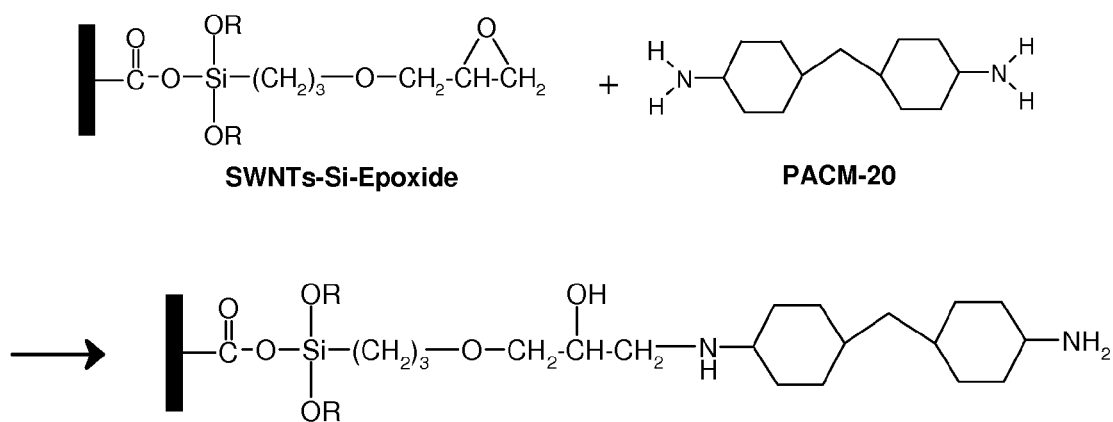
FIG. 22 is a schematic representation of a reaction of SWNTs-Si-epoxide with curing agent.

In some embodiments, the amount of SWNTs-Si-epoxide can be controlled by reaction in excess solvent/curing agent. SWNTs-Si-epoxide can be used if the SWNTs have amine groups in the prepolymer. FIG. 22 illustrates, schematically, the reaction of SWNTs-Si-Epoxide with curing agent.

Silane-Functionalized Fluorinated SWNTs

The present invention provides for key methods of sidewall-functionalizing SWNTs using organosilanes. More particularly, based on fluorinated SWNTs, such chemical functionalization generally includes three major steps: (1) fluorination of SWNTs to yield F-SWNTs; (2) attachment of hydroxyl-containing groups to the SWNTs by reaction of species containing terminal hydroxyl moieties with F-SWNTs to yield hydroxyl-functionalized SWNTs, and (3) reaction of the hydroxyl-functionalized SWNTs with silane species to yield silane-functionalized SWNTs. A primary example for composites applications of these silane-functionalized SWNTs is nanotube-reinforced glass fiber/vinyl ester composites. With vinyl functionalized silane, direct inclusion of functionalized nanotubes into vinyl ester matrices can be achieved through in situ free radical polymerization. Two benefits are obtained using this kind of silane-functionalized nanotube. First, functionalized nanotubes will therefore provide strong attachment to both fiber and matrix via robust chemical bonding. Second, significant improvement in nanotube dispersion in solvent and polymer matrix is obtained. Composite processing typically involves nanotube coating on the glass fiber surface and compression molding or vacuum assisted resin transfer molding processing.

Figure 23:
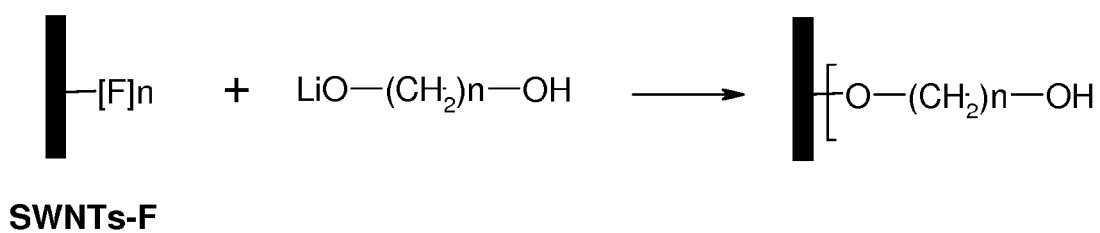
FIG. 23 is a schematic representation of a reaction of fluorinated SWNTs with lithium alkoxides.
Figure 24:
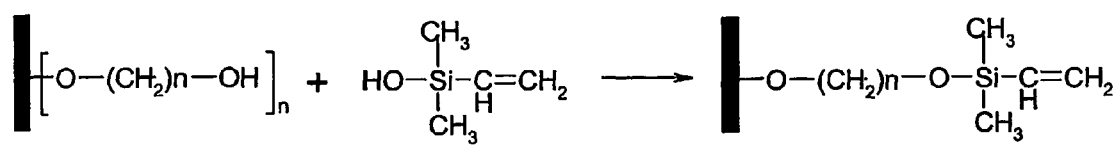
FIG. 24 illustrates a reaction between hydroxyl-functionalized SWNTs and silane species containing a vinyl polymerizable moiety.

In some embodiments, sidewall functionalization of SWNTs using organosilane species includes the following steps. First, fluoronanotubes (F-SWNTs) (dispersed in DMF solvent) are reacted with ethylene glycol or glycerin (treated with lithium hydroxide (LiOH)) during one to two hours of sonication. This type of reaction is shown in FIG. 23. After membrane filtration and washing with water and ethanol, hydroxyl-functionalized nanotubes are typically dispersed in ethanol solution, and acetic acid is added to adjust the pH value to ~45. Finally, ~1-2% silane coupling agent (for example, vinyltriethoxysilane or vinyidimethylethoxysilane used for vinyl ester composites application) is added to the nanotubes/ethanol solution for 30 minutes, with sonication, to obtain silane functonalized SWNTs. FIG. 24 illustrates a reaction between hydroxyl-functionalized SWNTs and silane species containing a vinyl polymerizable moiety.

The CNT-polymer composites of the present invention can have enhanced electrical, mechanical, optical and other properties. Indeed, such materials may be termed "multifunctional" by virtue of their variety of desirable properties. Applications for such materials include, but are not limited to, aerospace, automotive, construction, electrostatic discharge, paints and coatings, textiles, fibers, elastomers, medical implants, EM shielding, protection from lightning, fatigue resistance, and impact resistance. Note, however, in their functionalized state, the CNTs are generally non-conducting.

With the functionalization method described herein, the interface of nanotubes can be tailored with organosilane species for polymer composites applications. Compared with oxidation treatments using strong acids, this non-destructive sidewall functionalization is better for maintaining the nanotube structural integrity without introducing many defects and should, therefore, be less likely to affect the tensile strength of the nanotubes. By choosing different kinds of organosilanes with various functional groups, this general functionalization procedure can be extended for use in a wide range of polymer composites applications.

In the Examples which follow, single-walled carbon nanotubes were treated with several polymer compatible organosilanes for polymer composites applications. Infrared and Raman spectroscopic analysis was used to provide evidence for trialkoxy silanes species attachment to hydroxyl-functionalized nanotubes. This method offers the opportunity for direct inclusion of functionalized nanotube into polymer matrix via in situ polymerization. Furthermore, a high level of nanotube unroping in common organic solvents was obtained. Such silane treatments therefore not only enable the solubility of nanotubes in organic solvents to allow homogeneous dispersion in a polymer matrix, but also provide enhanced interfacial bonding for effective load transfer. The fabrication of nanotube polymer composites and property characterization have also been provided. An enhanced reinforcing effect was demonstrated by using silane functionalized nanotubes in an epoxy polymer.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

Materials used in the Examples which follow were obtained as follows: Purified SWNT BuckyPearls were provided by Carbon Nanotechnologies, Inc. SWNTs were produced by a high pressure HiPco process and fabricated into a millimeter scale sized BuckyPearl pellets. This material contains ~13 wt % Fe catalyst. Organosilanes were purchased from GELEST, Inc. Four silanes were used: Methacryloxypropyltrimethoxysilane including methacryl functional groups; 3-(N-styrlmethyl-2-aminoethylamino)-propyltrimethoxysilane including styrene functional groups; (3-Glycidoxypropyl) trimethoxylethoxy-silane including epoxy groups; and N-(2-Aminoethyl)-3-Aminopropyltrimethoxysilane including amino groups.

Characterization of product in the Examples which follow were acquired as follows: Attenuated total reflectance-Fourier transform infrared (ATR-FTIR) and Raman spectroscopy were used to characterize the functionalized SWNTs. The morphology of the nanotubes was investigated with a Philips environmental scanning electron microscope (FEG XL-30 ESEM) at an accelerating voltage of 30 kV. High-resolution transmission electron microscopic (TEM) images were obtained with a JOEL JSM 2010 TEM system at 100 kV.

Example 1

This Example serves to illustrate the fluorination and subsequent hydroxylation of CNTs. Purified SWNTs were fluorinated to yield "fluoronanotubes" using a procedure developed at Rice University [Mickelson, E. T.; Huffman, C. B.; Rinzler, A. G.; Smalley, R. E.; Hauge, R. H.; Margrave, J. L. Chem. Phys. Lett. 1998, 296, 188; Chiang, I. W. Ph.D. Thesis, Rice University, Houston, Tex., 2001]. The fluorination was carried out in a Monel reactor heated at 150° C. for 12 hours. The gas flow ratio for fluorine, hydrogen and helium was 2:1:30. Then, hydroxylated nanotubes were prepared through reaction of lithium hydroxide treated ethylene glycol with fluoronanotubes (FIG. 1) with two hours of sonication. See commonly-assigned co-pending International Patent Application No. PCT/US2004/019015 entitled, "Sidewall Functionalization of Carbon Nanotubes with Hydroxyl-Terminated Moieties," filed Jun. 16, 2004, as well as in L. Zhang et al., Chem. Mater., 2004, 16, 2055-2061.

Example 2

This Example serves to illustrate the silation of hydroxyl-functionalized CNTs. A hydroxyl functionalized SWNT solution was diluted with water and filtered using 0.2 µm pore size PTFE membrane filter, and flushed several more times with water and ethanol to eliminate un-reacted residue. The hydroxyl-functionalized nanotubes were then dispersed in ethanol solution again (1 mg/1 ml) with the aid of sonication. Acetic acid was added to adjust the pH value to 5. Then, a silane coupling agent was added to the mixture to form a 0.2% ethanol solution. The mixture was sonicated for 1 hour in a 40 KHz bath sonicator. The solution was dried at room temperature to evaporate off ethanol and heated at 110° C. for 2 hours for postcure. Finally, the silane-functionalized SWNTs were dissolved into acetone with applied sonicaton to wash off any unreacted silane. Such silane reactions on a nanotube surface is shown in Scheme 3.

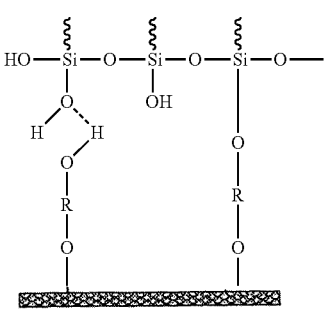

Scheme 3 where Y represents organofunctional groups such as amino, epoxy, vinyl, methacryl etc., which readily undergo anionic or free-radical polymerization and form covalent bond with other monomer in the polymer composites.

Figure 25:
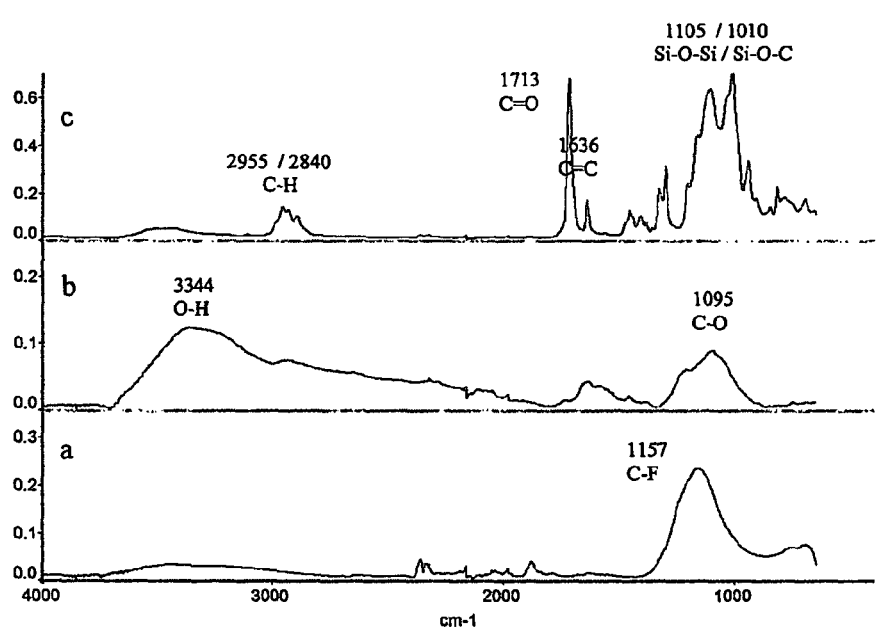
FIG. 25 depicts the infrared spectrum comparison of the fluoronanotubes, hydrolyzed nanotubes and silane-treated nanotubes, wherein the respective traces are directed to a) F-SWNT, b) SWNT-R—OH, and c) SWNTs treated with methacryloxypropyltrimethoxysilane.
Figure 27:
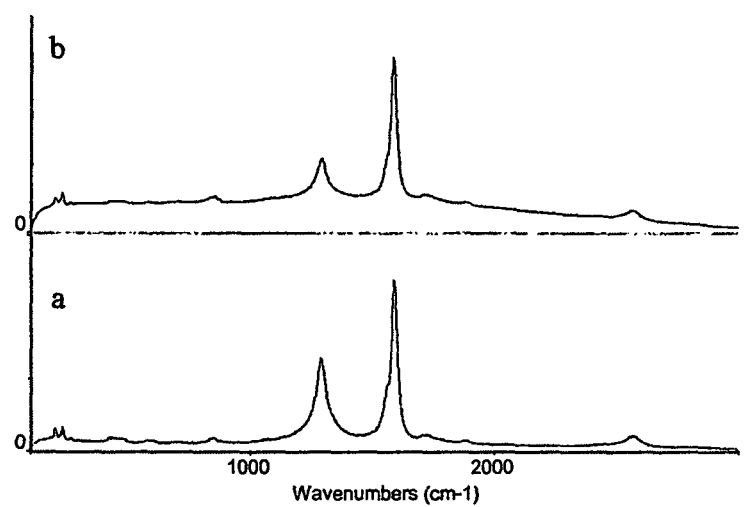
FIG. 27 depicts Raman spectra of (a) SWNTs-ROH; (b) silane treated SWNTs.

Characterization of silane attachment to nanotubes was achieved for polymer composites applications and confirmed via spectroscopic analysis. A Nicolet FTIR was used to analyze the functional groups attached to sidewalls of SWNTs. FIG. 25 presents the infrared spectrum comparison of the fluoronanotubes, hydrolyzed nanotubes and silane-treated nanotubes. After reaction of a hydroxyl-containing species with the fluoronanotubes, a broad band from 3000 to 3500 $cm^{-1}$ indicated the presence of OH groups attached to the sidewalls of the nanotubes. A new band appears at 1095 $cm^{-1}$ and can be assigned to the C—O bond with corresponding C—F peak reduction. A large amount of OH groups provide an opportunity to produce hydrogen bonding and possible covalent linkages with silane. With water present, the alkoxy groups of the silanes are very easily hydrolyzed to form silanol-containing species. Condensation to oligomers occurs first. The unreacted OH groups can form hydrogen bonds with OH groups of the nanotube. During post-curing, a covalent linkage may be formed with the nanotubes with concomitant loss of water as shown in Scheme 3. IR spectrum for nanotubes treated with methacryloxypropyltrimethoxysilane is shown in FIG. 25(c). The appearance of strong peaks at 1713 $cm^{-1}$ and 1636 $cm^{-1}$ represents the characteristics of corresponding C═O and C═C individually in the methacryl groups, which are compatible with vinyl ester or polyester system. From the spectrum of the silanized nanotubes, a sharp decrease of OH band indicates the polymerization formation of silanol itself and bonding between OH and one silanol. Two silanol groups may condense to form Si—O—Si [B. Arkles, CHEMTECH, 7, 766, 1977]. The appearance of doublet peaks at 1105 and 1010 $cm^{-1}$, clearly show the presence of the Si—O—Si and Si—O—C asymmetric stretch, respectively [D. R. Anderson, Analysis of Silicones, A. L. Smith, editor, Wiley-Interscience, New York, 1974, Chapter 10]. To verify that the silane polymers are not just physically attached to nanotubes, same silane treatment procedure was applied to pristine nanotubes. IR revealed no features of the silane species. Also monoalkoxy silanes were also used and were shown to be much less effective due to the tendency for silanes to condensate themselves. The Raman spectrum in FIG. 27 confirmed the functionalization of nanotubes. Peak attenuation for silane-treated nanotubes (b) suggested the cover or wrapping of nanotubes by silane polymer.

Figure 26:
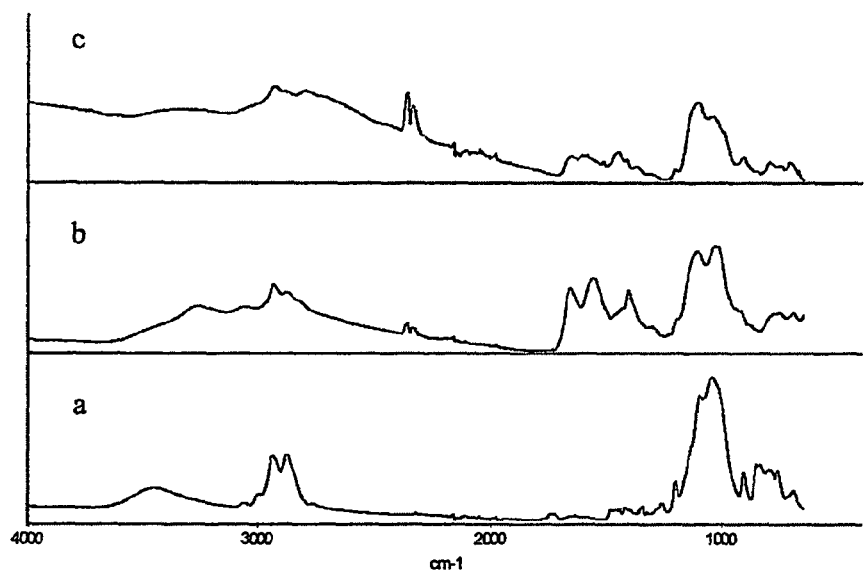
FIG. 26 depicts the infrared spectrum of silane-functionalized SWNTs, wherein the respective traces are directed to functionalization with silanes a) 3-(N-styrylmethyl-2-aminoethylamino)-propyltrimethoxysilane [CH$_2$=CH(C$_6$H$_5$) CH$_2$NH(CH$_2$)$_2$NH(CH$_2$)$_3$Si(OCH$_3$)$_3$], b) N-(2-Aminoethyl)-3-Aminopropyltrimethoxysilane [H$_2$N(CH$_2$)$_2$NH (CH$_2$)$_3$ Si(OCH$_3$)$_3$], and c) (3-Glycidoxypropyl) trimethoxyethoxy-silane [CH$_2$—(O)—CHCH$_2$O (CH$_2$)$_3$Si (OCH$_3$)$_3$]

To demonstrate the efficiency of silane treatment for various polymer composites applications, several other common silanes for epoxy and vinyl ester applications were also used to treat nanotubes. All FTIR spectrum of silane-functionalized SWNT in FIG. 26 showed attachment of corresponding silanes. For example, for amino-silane, the new peaks in 3260 (weak) and 2800-3000 $cm^{-1}$ regions, representing the N—H and C—H stretches, respectively, were observed. OH bands almost diminished due to silanol reaction. As the siloxane chains become longer or branched, the Si—O—Si absorption becomes broader and more complex overlapping bands.

Example 4

Figure 28:
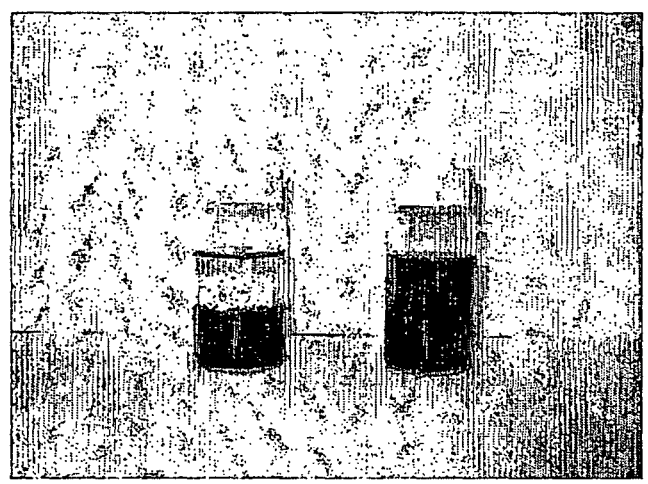
FIG. 28 depicts a dispersion of pristine SWNTs (left) and silane treated SWNTs in ethanol (right)
Figure 29:
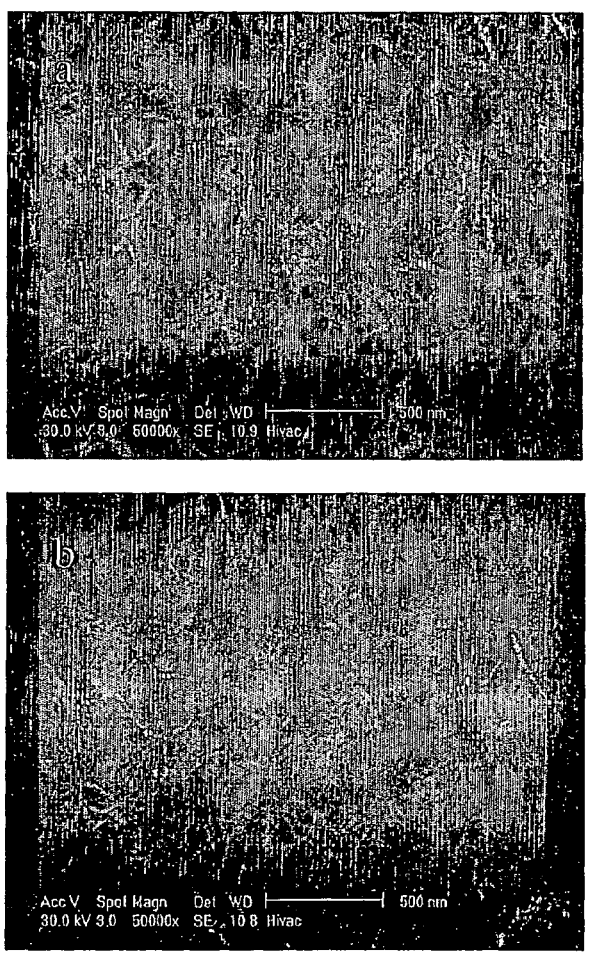
FIG. 29 depicts SEM images of (a) F-SWNTs (b) vinyl silane-SWNT.
Figure 30:
FIG. 30 depicts TEM images of (a) pristine SWNTs; and (b) functionalized SWNTs (scale bar at 20 nm), wherein unroping of the nanotube bundles is achieved (note individual SWNTs)

This Example serves to illustrate the enhancement in solubility seen in silane-functionalized CNTs, relative to unfunctionalized CNTs. Functionalized nanotubes in ethanol solution tend to swell a lot with volume, indicating the exfoliation of nanotube bundles. Silane-treated single-wall nanotube samples were found to exhibit significantly improved solubility and dispersion in alcohol, acetone, DMF and other common organic solvents. This should provide more homogeneous dispersion at smaller bundles size and even at individual level in the compatible polymer matrix FIG. 28 gives a visual comparison of Silane-SWNTs (dark colored homogeneous solution at high concentration) and pristine SWNTs in ethanol solution after sitting for two weeks. Pristine SWNTs are practically insoluble in organic solvents. Silane-SWNTs solutions in DMF remain stable without precipitation for over two months. SEM confirmed the smaller nanotube bundles sizes for the silane-SWNTs compared with fluronanotubes— as shown in FIG. 29. For more direct evidence, the silane-treated nanotubes were observed and imaged using a high resolution transmission electron microscopy. The TEM samples were prepared by applying a few drops of nanotube ethanol solution (with a concentration of 0.1 mg/ml) onto 200 mesh lacey formvar/carbon copper grids, and then letting the grids dry overnight to evaporate off the solvent. The TEM image shown in FIG. 30 shows the unroping of separated nanotube bundles and a lot of individual nanotubes (with diameters around 1 nm) can be observed. By comparison, pristine SWNT bundles typically have from 10 to 100 individual nanotubes attracted to each other by van der Waals forces. This result suggests that the functional groups help to exfoliate large bundles and form small bundles or individual nanotubes. Unroping of nanotubes makes it possible to easily disperse such nanotubes in a polymer matrix and to directly increase load transfer from the matrix.

Example 4

Figure 31:
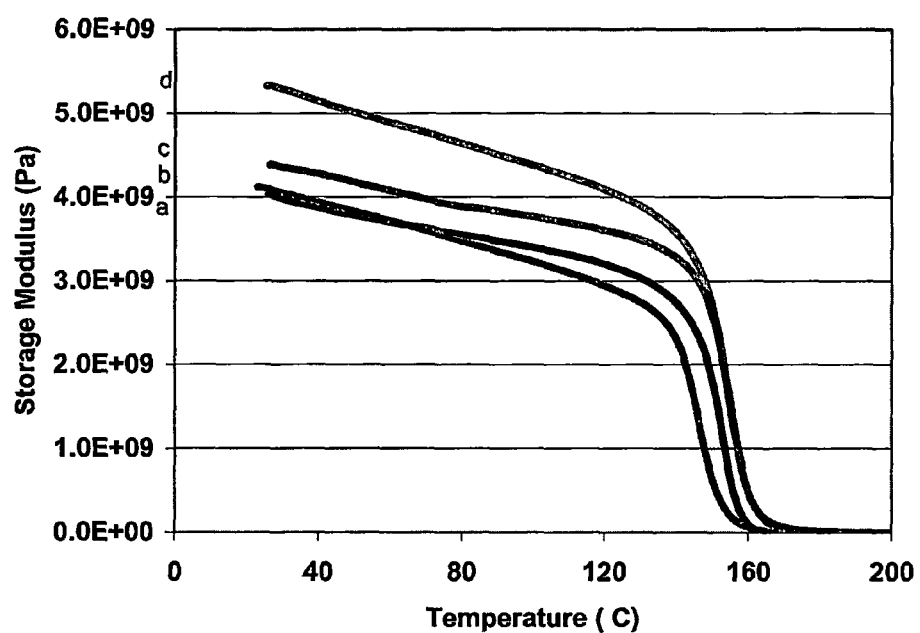
FIG. 31 depicts plots of storage modulus of epoxy/SWNTs composites (E') verse temperature: (a) No SWNTs, (b) 1 wt % pristine SWNTs and silane additives (c) 1 wt % hydroxyl-functionalized SWNTs, and (d) 1 wt % silane-functionalized SWNTs.

This Example serves to illustrate the dynamic mechanical analysis of CNT-polymer composites of the present invention. The reinforcing role of nanotubes for composite applications strongly depends on the extent of load transfer between the matrix and nanotubes. Several epoxy nanotube composites were fabricated, and their mechanical properties characterized, in a manner similar to that described in previous work [J. Zhu, J. Kim, H. Peng, J. L. Margrave, V. Khabashesku, E. V. Barrera, Nano Lett. 2003, 3, 1107]. In this Example, however, the curing cycles were extended to 12 hours. The various materials tested were: pure epoxy, epoxy with pristine SWNTs and silane additive, epoxy with 1 wt % hydrolyzed nanotubes, and epoxy with 1 wt % silane-functionalized nanotubes. The direct effect of functionalized nanotubes on the mechanical properties of the polymer has been evaluated by Dynamic Mechanical Analysis (DMA), which gives the temperature-dependent properties of materials, such as the storage modulus E', the loss modulus E" and the loss tan δ. These dynamic properties are highly affected by the filler fractions, the dispersion in the matrix, and adhesion between filler and the matrix. Dynamic mechanical analysis was performed in a Perkin-Elmer Pyris Diamond DMA instrument at a frequency of 1.0 Hz with dual-cantilever bend mode. The test temperature ranged from 25° C. to 200° C. at a heating rate of 5° C./min. The dynamic E' curves for nanotube epoxy samples and pure epoxy are illustrated in FIG. 31 (curves a-d). The composites with 1 wt % functionalized nanotubes show increased stiffness compared to the pure epoxy polymer and the composites loaded with pristine nanotubes and silane mixtures. The result demonstrates the efficient enhancement by silane-treated nanotubes. In comparison, the glass transition temperature (defined as the temperature at which maximum loss tan δ is reached) decreased when the same amount of silane and pristine SWNTs was directly added into epoxy. This is because the silane simply plasticized the epoxy and reduced the degree of cross-linking.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A composite material, comprising:
   a) carbon nanotubes, wherein the carbon nanotubes are silane-functionalized with an organosilane species;
   b) a fiber reinforcement material, wherein the fiber reinforcement material comprises glass fibers and wherein the organosilane species further silane-functionalizes the glass fibers;
   c) a polymer;
   wherein the carbon nanotubes are covalently bound to both the fiber reinforcement material and the polymer;
   wherein the carbon nanotubes continuously coat the fiber reinforcement material so as to exclude the polymer between the carbon nanotubes and the fiber reinforcement material; and
   wherein the carbon nanotubes comprise a bridge between the fiber reinforcement material and the polymer.

2. The composite material of claim 1, wherein the carbon nanotubes are single-wall carbon nanotubes.

3. The composite material of claim 1, wherein the polymer is an epoxy.

4. The composite material of claim 1, wherein the glass fibers are in a form of woven sheets.

5. The composite material of claim 4, wherein the woven sheets are stacked together with the carbon nanotubes and the polymer between them.

6. The composite material of claim 1, wherein the carbon nanotubes are hydroxyl-functionalized carbon nanotubes that have been further silane functionalized;
   wherein the hydroxyl-functionalized carbon nanotubes comprise undestroyed rolled up graphene sheets; and
   wherein the hydroxyl-functionalized carbon nanotubes are prepared by reacting fluorinated carbon nanotubes with a reagent selected from the group consisting of a mono-metal salt of a dialcohol, a mono-metal salt of a multi-alcohol, and an amino alcohol.

7. The composite material of claim 6, wherein the hydroxyl-functionalized carbon nanotubes are further silane functionalized with a silation reagent selected from the group consisting of a silanol and a chlorosilane.

8. The composite material of claim 1, wherein the organosilane species is derived from a silane agent, the adding further comprises providing the silane agent, and the silane agent is selected from the group consisting of methacryl silanes, amino silanes, epoxy silanes, and styrene silanes.

9. The composite material of claim 8, wherein the silane agent comprise an amino silane.

10. The composite material of claim 9, wherein the amino silane comprises 3-aminopropryltrimethoxy silane.

11. The composite material of claim 10, wherein the organosilane species is bonded to the carbon nanotubes with C—O bonds.

12. The composite material of claim 10, wherein the organosilane species is bonded to the carbon nanotubes with C—N bonds.

13. The composite material of claim 8, wherein the silane agent comprise an epoxy silane.

14. The composite material of claim 8, wherein the epoxy silane comprises trimethoxyepoxy silane.

* * * * *

UNITED STATES PATENT AND TRADEMARK OFFICE
CERTIFICATE OF CORRECTION

PATENT NO. : 8,541,322 B2  Page 1 of 1
APPLICATION NO. : 10/576134
DATED : September 24, 2013
INVENTOR(S) : Barrera et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1297 days.

Signed and Sealed this
Fifteenth Day of September, 2015

Michelle K. Lee
*Director of the United States Patent and Trademark Office*